US007886036B2

(12) United States Patent
Ardagna et al.

(10) Patent No.: US 7,886,036 B2
(45) Date of Patent: Feb. 8, 2011

(54) METHOD, SYSTEM AND COMPUTER PROGRAM FOR CONFIGURING SERVER FARMS AT MINIMUM COST

(75) Inventors: Danilo Ardagna, Milan (IT); Eugenio Conforti, Reggio Emilia (IT); Chiara Francalanci, Milan (IT); Silvia Lucchini, Milan (IT); Gatti Mauro, Parma (IT); Salvatore Morsello, Milan (IT); Marco Trubian, Milan (IT)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 11/923,767

(22) Filed: Oct. 25, 2007

(65) Prior Publication Data

US 2008/0104383 A1    May 1, 2008

(30) Foreign Application Priority Data

Oct. 26, 2006  (EP)  .................................. 06123004

(51) Int. Cl.
*G06F 15/173* (2006.01)
(52) U.S. Cl. ...................... 709/223; 709/220; 709/225; 713/1
(58) Field of Classification Search .................. 709/220, 709/223, 225; 705/8; 713/1
See application file for complete search history.

(56) References Cited

U.S. PATENT DOCUMENTS

| | | | |
|---|---|---|---|
| 7,050,961 B1 | 5/2006 | Lee et al. | |
| 7,484,010 B2 * | 1/2009 | Sridhar et al. | 709/249 |
| 2003/0208284 A1 | 11/2003 | Stewart et al. | |
| 2005/0132088 A1 * | 6/2005 | Sridhar et al. | 709/249 |
| 2005/0138170 A1 * | 6/2005 | Cherkasova et al. | 709/225 |
| 2006/0004548 A1 * | 1/2006 | Santos et al. | 703/1 |
| 2006/0277549 A1 * | 12/2006 | Li et al. | 718/104 |
| 2007/0174335 A1 * | 7/2007 | Konig et al. | 707/104.1 |
| 2008/0183543 A1 * | 7/2008 | Li et al. | 705/8 |
| 2008/0281652 A1 * | 11/2008 | Iqbal et al. | 705/7 |

OTHER PUBLICATIONS

European Search Report, Application No. 06123004.1-2211, pp. 1-4, Completion Date Mar. 7, 2007.

* cited by examiner

*Primary Examiner*—Thomas Lee
*Assistant Examiner*—Zahid Choudhury
(74) *Attorney, Agent, or Firm*—Andrea Bauer; Hoffman Warnick LLC

(57) ABSTRACT

A solution is provided for configuring a server farm (for example, to run a SAP application). The SAP application sets corresponding operational constraints for the server farm (defined by a required processing power and a required memory for the application instances and the DBMS instance of the SAP application). A mathematical model of the server farm is defined, so as to allow selecting the optimal configuration thereof that minimizes its total cost. For this purpose, the servers are chosen with a memory proportional to the corresponding power. More complex models are then provided for a high-reliability scenario, a scalability scenario, and a consolidation scenario.

14 Claims, 7 Drawing Sheets

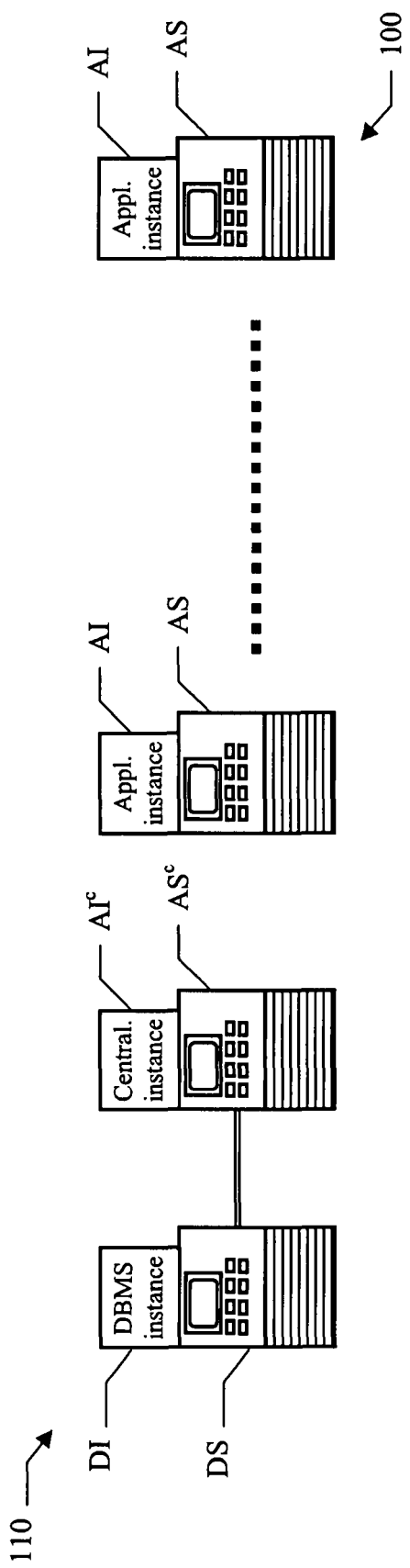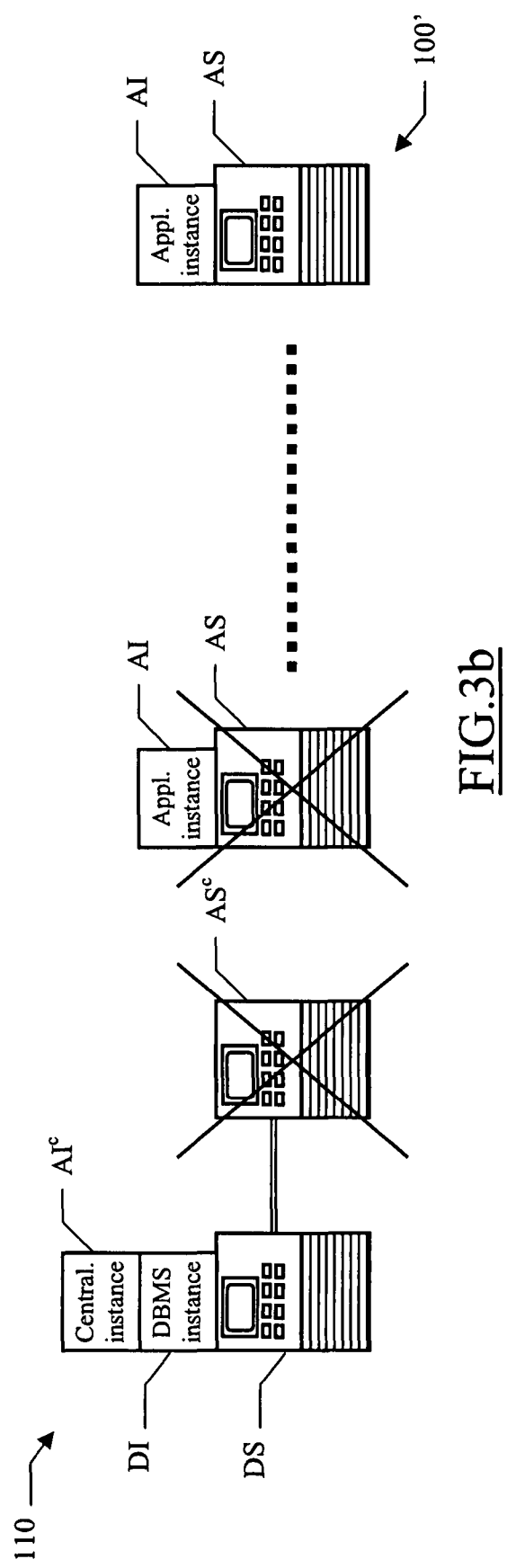

METHOD, SYSTEM AND COMPUTER PROGRAM FOR CONFIGURING SERVER FARMS AT MINIMUM COST

BACKGROUND OF THE INVENTION

1. Field of the Invention

The present invention relates to information technology. More specifically, the present invention relates to the configuration of data processing systems.

2. Related Art

Data processing systems with distributed architecture are commonly used to run a number of software applications. In a distributed architecture, client computers exploit services offered by server computers across a network. A typical example is that of a server farm, which consists of a collection of servers, typically housed in the same location, offering the required services.

For this purpose, the servers are combined so as to appear as one or more application areas to the clients. In this way, the server farm can exploit the power of the multiple servers for processing the enormous amount of service requests that are routinely submitted in several environments (such as in large companies or on the Internet). Moreover, the server farm provides a single point of management and facilitates the scaling of the system. At the same time, the server farm ensures a high reliability since its operation may be recovered even in case of failure of one or more servers. Typically, the server farm also implements load-balancing techniques, which are used to distribute the workload among its individual servers; moreover, this allows scheduling the processing of the incoming service requests (for example, according to different priorities).

The configuration of a server farm is a complex process. Indeed, the required servers may be acquired from a number of vendors; moreover, each vendor can offer a wide range of models, each one available in multiple versions (such as with different processors, working memory, and the like). Therefore, a huge number of configurations of the server farm (each one defined by a combination of selected servers) are available. Moreover, many of the available configurations are eligible to implement the server farm, since they exhibit characteristics meeting operational constraints imposed by the software application to be run (such as the necessary processing power, working memory, and the like). Therefore, it is very difficult to select one out of the eligible configurations that optimizes specific design parameters (such as a total cost of the server farm). For example, in some situations it would be preferable to consolidate the server farm on a few servers with many processors, whereas in other situations it would be preferable to distribute the same server farm throughout many servers with a few processors. Likewise, it would be possible to provide the servers with large or small memories, at the same time reducing or increasing their number, respectively.

The problem is exacerbated when the software application features a multi-tier architecture, with different modules having distinct requirements (in terms of processing power and working memory in the example at issue). A typical example is that of the System Applications and Products in data processing (SAP™) by SAP AG; the SAP application consists of an integrated suite of products that allow interacting with a common database for a comprehensive range of services (such as for managing financial, asset, cost accounting, production, human resources, logistic, document archive, customer relationship and supply chain operations). In this case, the server farm is not homogeneous and includes different servers for the corresponding modules. Particularly, in the example of the SAP application, DBMS servers are required to host DBMS instances (managing the common database), and application servers are required to host application instances (managing the offered services).

Therefore, the process of configuring the server farm becomes quickly unmanageable manually for a system designer. The current practice is then of using rule-of-thumbs and intuition to select the desired configuration. However, this requires a trial and error approach to ensure that the selected configuration actually meets the operational requirements of the software application and provides an acceptable result in terms of the design parameters. Therefore, the resulting server farm (corresponding to the selected configuration) is commonly oversized; indeed, the safest configuration is always selected (as a precautionary measure) in the impossibility of identifying the configuration that is actually optimal. In any case, the result strongly depends on the skill of the system designer.

Moreover, the difficulty of the configuration process does not allow taking into account more complex scenarios. For example, the problem of providing acceptable performance of the server farm (even in case of failure of one or more servers) is generally disregarded. Further, the configuration of the server farm is selected without coping with the problems involved by the possibility of consolidating multiple (virtual) servers on one or more physical computers.

In any case, the obtained results are always based on the current situation when the configuration of the server farm is selected. Therefore, the selected configuration (even if acceptable at the moment) may involve problems when it must be upgraded in the future. For example, a configuration of the server farm adapted to the current workload may become quickly inadequate because of an increase of the service requests; in this case, it is possible that the cost of changing one or more servers may defeat the initial saving.

SUMMARY OF THE INVENTION

The present invention provides a solution for finding optimized configurations of data processing systems.

A first aspect of the present invention provides a method for configuring a data processing system (such as a server farm); the system is used to host at least one software application (such as a SAP application). The software application includes a set of (one or more) first modules of a first type (such as application instances), and a set of (one or more) second modules of a second type (such as DBMS instances). The first modules require a first required processing power and a first required working memory; likewise, the second modules require a second required processing power and a second required working memory. The method starts with the step of providing an indication of a cost, an available processing power and an available memory of each one of a plurality of data processing entities (such as servers), which are available to define available configurations of the system (each one including a corresponding set of the entities). A target function indicative of a target cost of the system is defined. The target cost is defined according to a total cost of each configuration, based on the costs of the corresponding entities. The target function is constrained by a set of constraints for the available power and the available memory of each entity based on the first required power, the first required memory, the second required power and the second required memory; the constraints are simplified by setting the available memory of each entity as a predefined function of the corresponding available power. One of the configurations is then selected by optimizing the target function. It is now possible to configure the system according to the selected configuration.

In an embodiment of the invention, this function is of the linear type.

In a basic scenario, a single SAP application is taken into account (with each server that can host at most a single DBMS/application instance thereof).

In this case, the available memory of each application server is set at least equal to the corresponding required memory, which is multiplied by its available power divided by the sum of the available powers of all the application servers.

One implementation for simplifying the solution of the model is based on a linearizing technique. Alternatively, an iterative technique can be used.

As further enhancements, a model for a high-reliability scenario, a model for a scalability scenario, and a model for a consolidation scenario are also provided.

A specific Set Covering (SC) technique for simplifying the solution of the latest model is also provided.

The process can be further simplified by taking into account homogeneous configurations only at the beginning.

Another aspect of the present invention proposes a corresponding service.

A further aspect of the invention proposes a computer program for performing the above-described method.

A still further aspect of the invention proposes a corresponding system.

BRIEF DESCRIPTION OF THE DRAWINGS

The invention itself, as well as further features and the advantages thereof, will be best understood with reference to the following detailed description, given purely by way of a non-restrictive indication, to be read in conjunction with the accompanying drawings.

FIGS. 3a-3b show a functional organization of the server farm adapted to the application of the solution according to an embodiment of the invention in a high-reliability scenario.

DETAILED DESCRIPTION OF THE INVENTION

Figure 1:
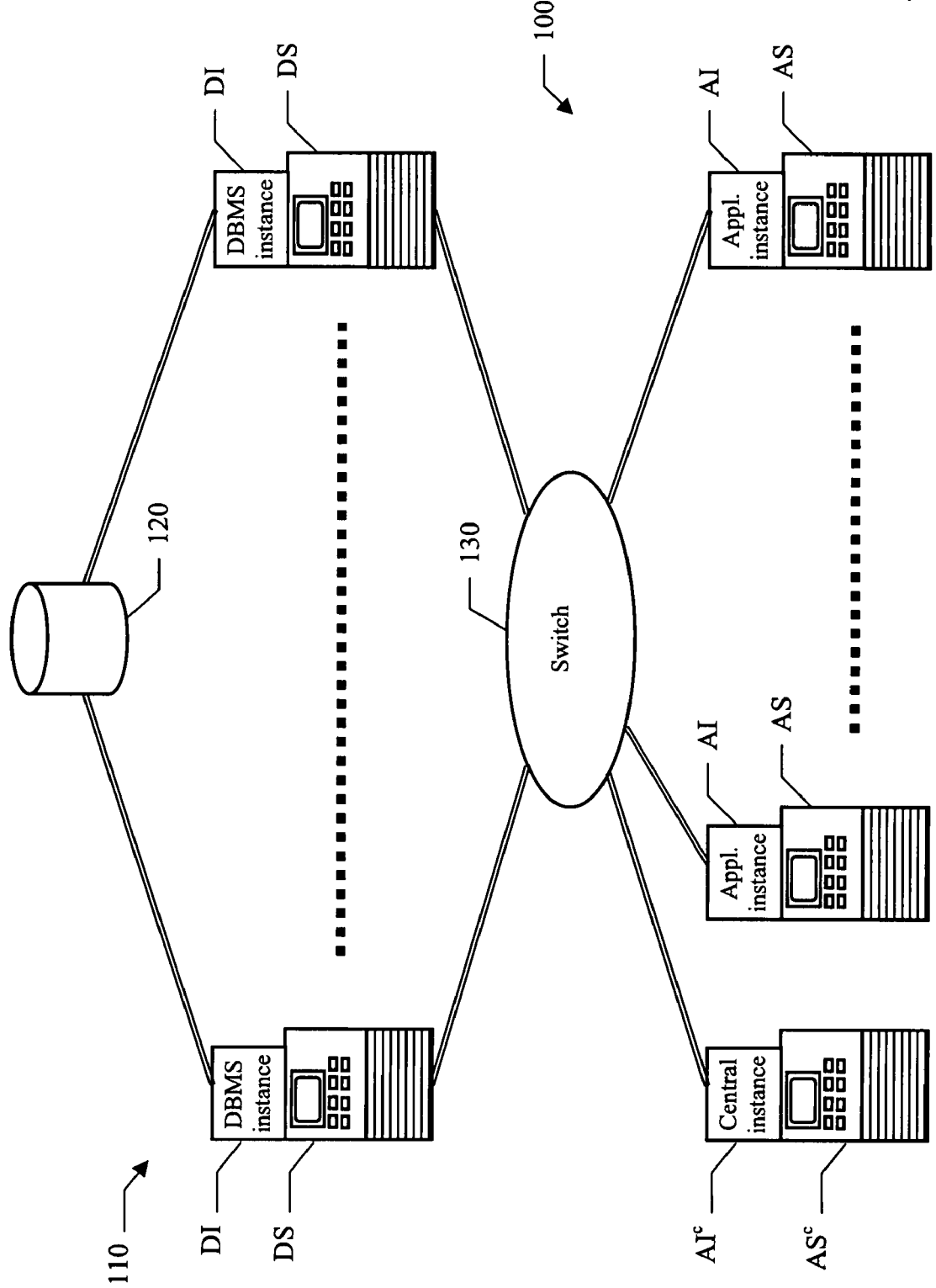
FIG. 1 is a schematic block diagram of a server farm that may be configured by means of a solution according to an embodiment of the invention.

With reference in particular to FIG. 1, a server farm 100 is depicted. The server farm 100 is used to run one or more software applications 110 (for example, each one comprising a SAP R/3). Each SAP application 110 includes one or more application instances AI; the application instances AI include modules that are functionally identical, each one being adapted to implement the services offered by the SAP application 110. One of the application instances is set to operate as a load-balancer, also known as central instance—differentiated by adding an apex c, i.e., $AI^C$ (with a single central instance $AI^C$ that can be active in the SAP application 110 at any time). The central instance $AI^C$ receives service requests from remote clients (not shown in the figure), and it distributes them to the other application instances AI for their execution (with the central instance $AI^C$ that may either process some of the service requests or not). The SAP application 110 also includes one or more DBMS instances DI, which manage a common database 120 for all the application instances AI; however, only a single DBMS instance DI can be active in the SAP application 110 at any time.

In order to run the SAP application 110, the server farm 100 includes one or more application servers AS, each one hosting a corresponding application instance AI. The application server hosting the central instance $AI^C$ is referred to as central server, and it is differentiated by adding the same apex c, i.e., $AS^C$. The central server $AS^C$ implements a single point of access to the server farm 100 for the clients. The server farm 100 also includes one or more DBMS servers DS, each one hosting a corresponding DBMS instance DI. All the servers AS, DS communicate to each other through a switch 130.

The running of the SAP application 110 requires specific hardware resources. Particularly, a (minimum) processing power is required by the application instances AI as a whole. For example, the required power is defined by the number of SAPSs (SAP Application benchmark Performance Standards). A SAPS represents the basic measuring unit that has been defined in the SAP environment (with 100 SAPSs that represent the processing power required to process 2.000 fully business order line items per hour in the SAP SD Benchmark). Moreover, a (minimum) working memory is also required by the application instances AI as a whole. For example, the required memory is defined by its size in terms of Gbytes. Likewise, each DBMS server DI (when it is active) requires a (minimum) processing power and a (minimum) working memory.

The resources required by the SAP application 110 set corresponding operational constraints to the server farm 100. Particularly, the whole of the application servers AS must provide at least the processing power and the working memory required by the application instances AI. Likewise, each DBMS server DS must provide at least the processing power and the working memory required by the corresponding DBMS instance DI. Generally, in the SAP environment the operational constraints relating to the processing power are expressed by the processing power that is required by the whole SAP application 110 (including the application instances AI and the DBMS instance DI) and by a load ratio between the required power for the application instances AI and the required power for the SAP application 110 (from which the required power for each DBMS instance DI can be readily calculated).

The server farm 100 must be designed to meet those operational constraints (i.e., the required power and the required memory for the application servers AS, and the required power and the required memory for each DBMS server DS). For this purpose, there are available many configurations of the server farm 100, each one defined by one or more application servers AS and one or more DBMS servers DS (with different characteristics) that are available on the market. However, only the available configurations of the server farm 100 that satisfy the operational constrains set by the SAP application 110 are eligible to be selected. The selection then involves choosing one out of the eligible configurations that optimizes specific design parameters. For example, the optimal configuration is the one that minimizes a total cost of the server farm 100, as defined by the sum of the costs of its servers AS, DS.

The above-mentioned optimization process will be described in the following as applied to different scenarios of increasing complexity.

Figure 2:
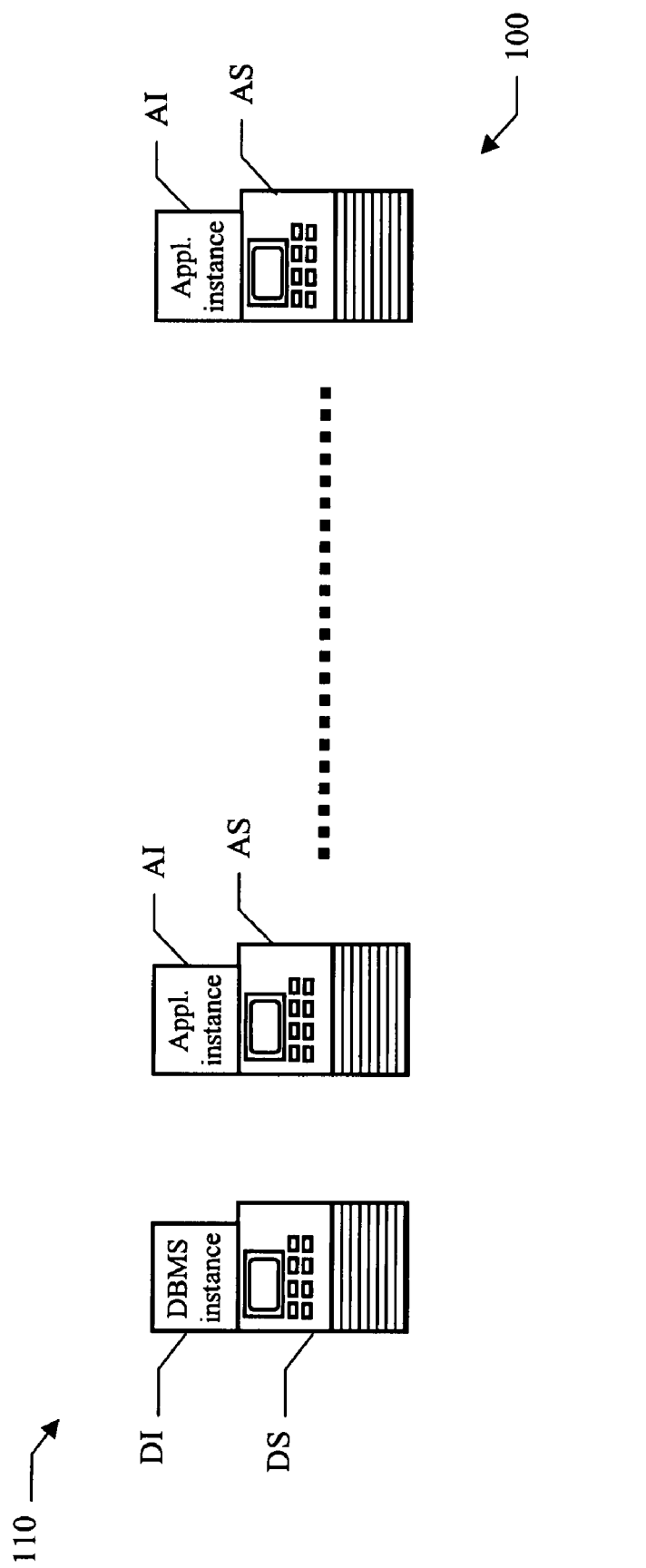
FIG. 2 shows a functional organization of the server farm adapted to the application of the solution according to an embodiment of the invention in a basic scenario.

The functional organization of the server farm 100 in a basic scenario is shown in FIG. 2. In this case, the server farm 100 includes one or more application servers AS (one of them acting as the central server), where each application server AS hosts a single application instance AI (to which all the resources of the application server AS, i.e., the available power and the available memory—are dedicated). Moreover, the server farm 100 includes a single DBMS server DS, which likewise hosts the (single) DBMS instance DI (to which the available power and the available memory of the DBMS server DS are dedicated).

In the solution according to an embodiment of the present invention, as described in detail in the following, the optimization process is based on the assumption that the required memory for the application instances AI is distributed among the application servers AS according to the corresponding available powers (for example, with their available memories that are proportional to the corresponding available powers).

In this way, the modeling of the server farm 100 for the optimization process is strongly simplified. As a result, the problem can be solved in a reasonable time even when there is available a high number of servers (such as some thousands), with a corresponding exponential number of their combinations. Therefore, it is possible to select the real optimal configuration, defined by a combination of the available servers that actually minimizes the total cost of the server farm, by exploiting mathematical programming techniques (described in detail in the following). The devised solution avoids the never-ending exhaustive examining of all the eligible configurations. This prevents any oversizing of the resulting server farm 100 (corresponding to the selected configuration). Experimental results on real server farms (already configured manually) have shown that the proposed technique allows obtaining significant savings in the total cost of the server farms (from a few points/percent up to 70%). In any case, the result is now completely independent of any human intervention. As such, the risk of errors in the configuration of the server farm 100 is strongly reduced.

The functional organization of the server farm 100 in a high-reliability scenario is shown in FIG. 3a. In this case, the unique entities of the SAP application 110 defining corresponding single point of failures (i.e., the central instance $AI^C$ and the DBMS instance DI) are protected by means of a High-Availability (HA) cluster. More specifically, the central server $AS^C$ and the DBMS server DS are coupled in a back-up scheme, so that each one of them can recover operation of the other one in case on any failure. For this purpose, it is necessary to provide a redundancy of the corresponding resources, so that each server $AS^C$ and DS is able to host both the central instance $AI^C$ and the DBMS instance DI (in case of failure of the other server DS and $AS^C$, respectively.

In this case, the server farm 100 must be configured to meet an additional user constraint, which defines a performance decrease that is acceptable in case of failure of one or more application servers AS. Typically, this user constraint is defined by an acceptable power decrease of the available power for the application servers AI. On the other hand, assuming that the number of users remain the same before and after the failure, the required memory does not change. The high-reliability scenario only takes into account the failure of a single application server AS. This allows reducing the computational complexity of the optimization process, without substantially affecting the accuracy of the obtained results (since the probability of simultaneous failures of multiple application servers AS can be deemed negligible).

Therefore, as shown in FIG. 3b, should the central server $AS^C$ fails (as indicated by a cross in the figure), the central instance $AI^C$ may be moved to the DBMS server DS. Similar considerations apply if the DBMS server DS fails (not shown in the figure). On the other hand, should a generic application server AS. different from the central server $AS^C$, fails (as indicated by another cross in the figure), the operation of the resulting server farm (differentiated with a prime notation, i.e., 100') continues by means of the remaining application servers AS. In this case, the processing power and/or the working memory provided by the remaining application servers AS might fall below the required power and the required memory for the application instances AI. Nevertheless, the power actually provided by the remaining application servers AS is always at least equal to an acceptable value (defined by the difference between the required power and the acceptable power decrease for the application instances).

In this way, it is possible to ensure an acceptable performance of the server farm 100 in most practical situations.

Figure 4A:
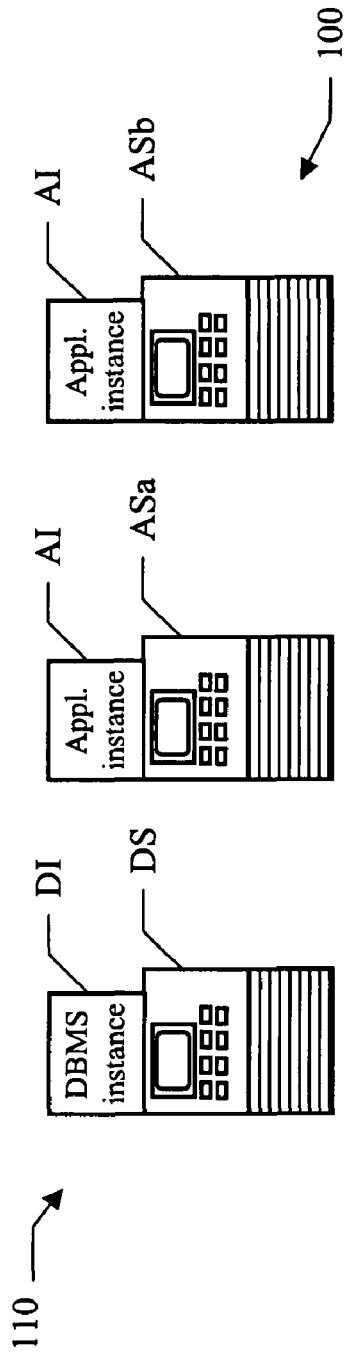
FIGS. 4a-4b show a functional organization of the server farm adapted to the application of the solution according to an embodiment of the invention in a scalability scenario.

Moving now to FIG. 4a, there is illustrated the functional organization of the server farm 100 in a scalability scenario. As in the case of the model based on the basic scenario, the server farm 100 includes one or more application servers AS (each one hosting a single application instance AI), and a single DBMS server DS (hosting the single DBMS instance DI). However, the optimal configuration of the server farm 100 is now selected (among the eligible ones) also taking into account its expected evolution over time, as defined by a further user constraint (specifying an expected increase factor of the workload of the SAP application in the future). For this purpose, the operational constraints (i.e., the required power and the required memory for the application servers AS and the required power and the required memory for each DBMS server DS) are defined at a current time and also at one or more next times (for example, at intervals of some years). At the current time, the total cost of each eligible configuration of the server farm 100 (i.e., satisfying the operational constrains at the current time) is defined as above according to the costs of the corresponding eligible servers. At each next time, instead, the total cost of each eligible configuration of the same server farm 100 (i.e., satisfying the operational constrains at the next time) is defined according to the cost of any new server AS, DS added to the server farm 100 (with respect to the configuration at the preceding time) and to the cost of any upgrade of a server AS, DS (already included in the configuration at the preceding time) to a higher-level version, i.e., with more available power and/or available memory. The (global) total cost to be minimized in now defined by the (partial) total costs at the different times. For example, the global total cost is calculated by summing all the partial total costs suitable actualized. Preferably, the scalability scenario is based on the current time and a single next time only. This allows reducing the computational complexity of the optimization process, without substantially affecting the quality of the obtained results (since any assumptions at further next times far away in the future are increasingly less accurate).

For example, as shown in FIG. 4a, at the current time the server farm 100 includes the DBMS server DS and two application servers (differentiated by adding the suffixes a and b, respectively, i.e., ASa and ASb). Passing to FIG. 4b, later on (such as after some years), the server farm, differentiated by adding an apex ˆ, i.e., 100ˆ, is upgraded to take into account increased operational constraints (such as a higher required power and/or required memory for the DBMS instance DI and the application instances AI). In the example at issue, the DBMS server DS and the application server ASb remain unchanged. On the contrary, the other application server is upgraded to a higher-level version (denoted with ASaˆ). Moreover, a further application server (denoted with ASc) is added to the server farm 100ˆ.

In this way, it is possible to select the configuration that actually minimizes the total cost of the server farm 100 over time (i.e., both at the beginning and in the future). This allows preventing any problem when the server farm 100 must be upgraded to satisfy an (expected) increase of the service requests. For example, in some situations it is preferable to select servers that may be upgraded later on (even if they are more expensive at the beginning) instead of other servers that must be replaced (when the cost of the first servers plus their upgrade is lower than the cost of the second ones plus their replacement).

Figure 5:
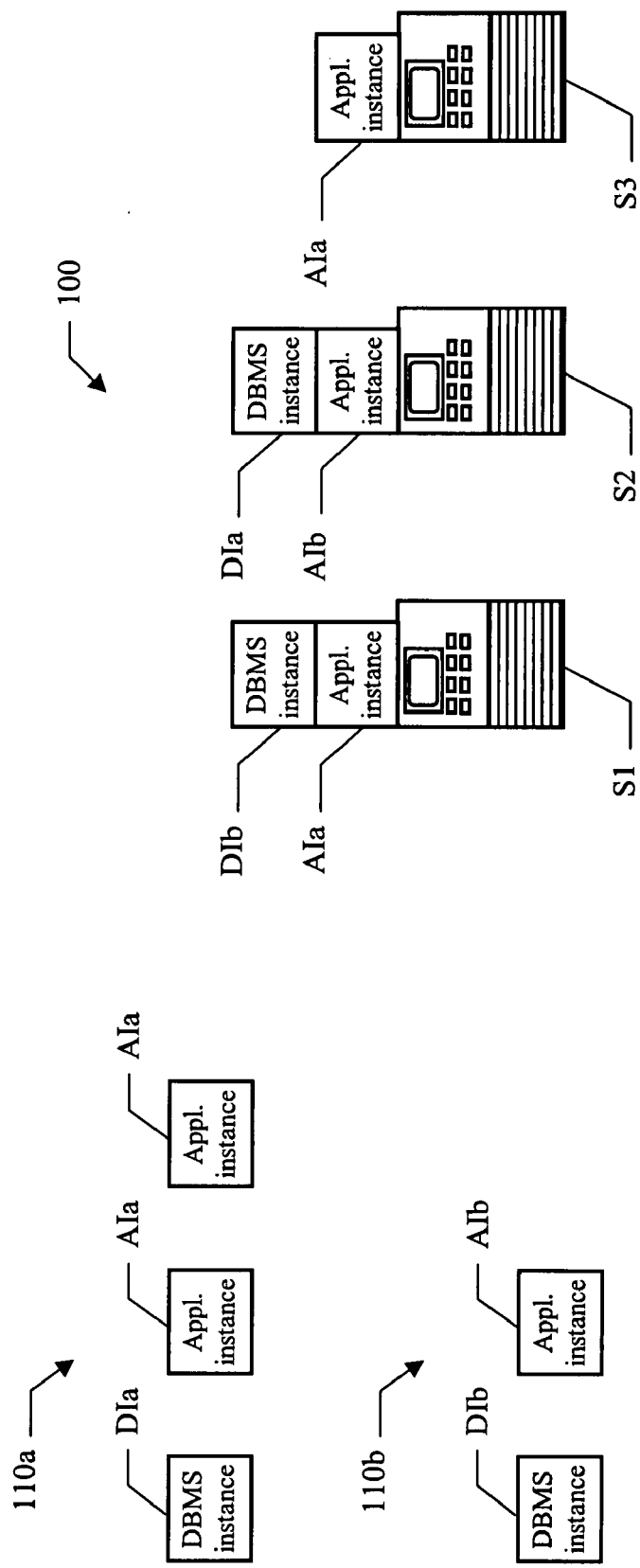
FIG. 5 shows a functional organization of the server farm adapted to the application of the solution according to an embodiment of the invention in a consolidation scenario.

At the end, the functional organization of the server farm 100 in a consolidation scenario is illustrated in FIG. 5. In this case, the server farm 100 hosts two or more SAP applications. For example, it is possible to host each application instance and DBMS instance on a corresponding virtual server. The virtual servers are in turn hosted on physical servers; for example, each virtual server is implemented by a corresponding partition, or virtual machine, of a physical server (with each physical server that may have one or more partitions). Alternatively, more application instances and/or DBMS instances may be installed on the same operating system. In the consolidation scenario, each SAP application has a single DBMS instance (as above). Moreover, each physical server hosts at most a single (application or DBMS) instance for each SAP application. This choice is a good compromise between the opposed requirements of high accuracy and acceptable computational complexity.

For example, a first SAP application (denoted with 110a) includes two application instances (denoted with AIa) and a DBMS instance (denoted with DIa). On the other hand, a second SAP application (denoted with 110b) includes an application instance (denoted with AIb) and a DBMS instance (denoted with DIb). In this case, the server farm 100 includes three (physical) servers, denoted with S1, S2 and S3. The server S1 hosts an application instance AIa of the SAP application 110a and the DBMS instance DIb of the SAP application 110b (in corresponding partitions). Likewise, the server S2 hosts an application instance AIb of the SAP application 110b and the DBMS instance DIa of the SAP application 110a. At the end, the server S3 only hosts the other application instance AIa of the SAP application 110a.

In this way, it is possible to exploit the possibilities offered by the modern virtualization techniques at their best.

The application of the proposed solution to the different scenarios mentioned above will be now described in greater detail by means of corresponding mathematical models.

Model 1

The first model relates to the basic scenario illustrated in FIG. 2. The model requires the following input parameters:

K: types of available servers;

$c_k$: cost of the available servers of the k-th type (kcK);

$s_k$: available power of the available servers of the k-th type;

$m_k$: available memory of the available servers of the k-th type;

$s_R$: required power for the SAP application;

$r_L$: load ratio (between the required power for the application instances and the required power for the SAP application);

$m_R^D$: required memory for the (single) DBMS instance; and $m_R^A$: required memory for the application instances.

The decisional variables of the model (which are output at the end of the optimization process so as to identify the optimal configuration of the server farm) are:

$x_k$: number of the available servers of the k-th type to be used as application servers (including the central server, managed without any problem as any other application server in this context); and $d_k$: number of the available servers of the k-th type to be used as DBMS server.

The model is defined by the following target function (to be solved so as to provide the values of the decisional variables $x_k$, $d_k$ defining the optimal configuration of the server farm):

$$\min \sum_{k \in S} c_k \cdot (x_k + d_k)$$

In other words, the target function is used to identify the optimal configuration of the server farm (out of the available ones), as defined by its application servers ($x_k$) and its DBMS server ($d_k$). The optimal configuration is selected as the one that minimizes the total cost of the server farm, given by the sum of the costs of the application servers ($c_k \cdot x_k$) plus the cost of the DBMS server ($c_k \cdot d_k$).

The target function is subjected to a number of constraints. Particularly, the constraints for the application servers are:

$$x_k \in N_0 \quad \forall k \in K \tag{1a}$$

$$\sum_{k \in K} s_k \cdot x_k \geq r_L \cdot s_R \tag{1b}$$

$$m_k \cdot x_k \geq m_R^A \frac{s_k \cdot x_k}{\sum_{q \in K} s_q \cdot x_q} \quad \forall k \in K \tag{1c}$$

The constraint (1a) indicates that the number of available servers of each type to be used as application servers is an integer. In other words, the optimal configuration includes zero, one or more application servers of each type. The constraint (1b) indicates that the sum of the available powers of all the application servers must be at least equal to the required power for the application instances. At the end, the constraint (1c) indicates that the available memory of each application server must be at least equal to a value, which is proportional to the whole required memory for the application instances according to its available power with respect to the whole available power of all the application servers. That is, the constraint (1c) expresses the above-mentioned assumption that the required memory for the application instances is distributed among the application servers according to the corresponding available powers.

Moreover, the constraints for the DBMS server are:

$$d_k \in \{0, 1\} \quad \forall k \in K \tag{1d}$$

$$\sum_{k \in K} d_k = 1 \tag{1e}$$

$$\sum_{k \in K} s_k \cdot d_k \geq (1 - r_L) \cdot s_R \tag{1f}$$

$$\sum_{k \in K} m_k \cdot d_k \geq m_R^D \tag{1g}$$

The constraint (1d) indicates that the number of available servers of each type to be used as DBMS server is zero or one.

The constraint (1e) indicates that the server farm includes a single DBMS server. The constraint (1f) indicates that the available power of the DBMS server must be at least equal to the required power for the DBMS instance. At the end, the constraint (1g) indicates that the available memory of the DBMS server must be at least equal to the required memory for the DBMS instance.

The model so obtained is not linear because of the constraint (1c). Two alternative possibilities are described in the following for simplifying the solution of the model.

A first possibility is of linearizing the constraint (1c). For this purpose, the term $$\sum_{q \in K} s_q \cdot x_q$$

is replaced with the term $r_L \cdot s_R$, so as to obtain an equivalent (linear) constraint—denoted with (1c'):

$$m_k \cdot x_k \geq m_R^A \frac{s_k \cdot x_k}{r_L \cdot s_R} \quad (1c')$$

In other words, the available memory of each application server is now assumed to be proportional to the whole required memory for the application instances according to its available power with respect to the whole required power of the application instances (instead of the actual whole available power of all the application servers).

In this way, the term at the right of the comparison sign in the constraint (1c') is increased, being $$\sum_{q \in K} s_q \cdot x_q \geq r_L \cdot s_R$$

because of the constraint (1b), and then the term at the left of the same comparison sign is increased as well. As a result, the available memory of the application servers in the optimal configuration of the server farm so obtained is oversized. However, this strongly reduces the computational complexity of the optimization process. In addition, the optimization process may be further simplified by observing that the constraint (1c') can be expressed as:

$$\left( m_k - m_R^A \cdot \frac{s_k}{r_L \cdot s_R} \right) \cdot x_k \geq 0 \quad (1c')$$

Therefore, since $x_k \geq 0$ because of the constraint (1a), we have that:

$$m_k - m_R^A \cdot \frac{s_k}{r_L \cdot s_R} \geq 0$$

Therefore, it is possible to exclude the types of available servers that do not meet this condition directly from the optimization process.

An alternative possibility for solving the model is of exploiting an iterative procedure. For this purpose, at a first iteration of the optimization process the constraint (1c) is simplified by disregarding the distribution of the required memory for the application instances among the application servers. In other words, the simplified constraint, denoted with (1c¹), now only indicates that the sum of the available memories of all the application servers must be at least equal to the required memory for the application instances:

$$\sum_{k \in K} m_k \cdot x_k \geq m_R^A \quad (1c^1)$$

The model is then solved with the above-mentioned constraints.

The same operations are reiterated by gradually refining the constraint (1c). More in detail, at each n-th iteration of the optimization process the constraint (1b) is rewritten so as to obtain an equivalent constrain, denoted with (1b''):

$$\sum_{k \in K} s_k \cdot x_k \geq a^{n-1} \quad (1b'')$$

where $a^{n-1}$ indicates the sum of the available powers of all the application servers included in the configuration obtained at the preceding iteration (n−1) of the optimization process. In this way, it is possible to simplify the constraint (1c) by replacing the term $$\sum_{q \in K} s_q \cdot x_q$$

with the term $a^{n-1}$, so as to obtain a simplified constraint— denoted with (1c''):

$$m_k \cdot x_k \geq m_R^A \frac{s_k \cdot x_k}{a^{n-1}} \quad (1c'')$$

In other words, the available memory of each application server is now assumed to be proportional to the whole required memory for the application instances according to its available power with respect to the whole available power of all the application servers of the preceding iteration. As above, the term at the right of the comparison sign in the constraint (1c'') is increased, being $$\sum_{q \in K} s_q \cdot x_q \geq a^{n-1}$$

because of the constraint (1b''), and then the term at the left of the same comparison sign is increased as well (so that the available memory of the application servers is oversized). The optimization process continues until the sum of the available powers of all the application servers remains substantially unchanged (i.e., $a^{n-1} - a^n = 0$ or lower than a predefined threshold). It is possible to demonstrate that a maximum error $\epsilon$ in the total cost of the resulting server farm, equal to the difference between a total cost of the obtained server farm (denoted with $c^{end}$) and its optimal value (denoted with $c^{opt}$), is:

$$\epsilon = c^{end} - c^{opt} \leq c^1 - c^{end}$$

where $c^1$ is the total cost of the server farm at the first iteration of the optimization process. This iterative technique is more time consuming than the linearization one described above. However, it reduces the oversizing of the available memory of the application servers.

Model 2

The second model relates to the high-reliability scenario illustrated in FIGS. 3a-3b.

The model requires the following further input parameter (in addition to the input parameters $K$, $c_k$, $s_k$, $m_k$, $s_R$, $r_L$, $m_R^D$ and $m_R^A$ described-above):

$r_F$: acceptable power decrease, defined by the ratio between the available power in case of failure of a single application server and the required power for the SAP application ($s_R$).

The decisional variables of the model are now:

$i_k$: number of the available servers of the k-th type to be used as central server;

$x_k$: number of the available servers of the k-th type to be used as application servers (different from the central server);

$z_k$: flag indicating whether the available servers of the k-th type are used as one or more application servers different from the central server (which flag facilitates the definition of the corresponding constraints, as it will be apparent in the following); and $d_k$: number of the available servers of the k-th type to be used as DBMS server.

The model is defined by the following target function (to be solved so as to provide the values of the relevant decisional variables defining the optimal configuration of the server farm):

$$\min \sum_{k \in K} c_k \cdot (x_k + i_k + d_k)$$

In other words, the target function is used to identify the optimal configuration of the server farm, as defined by its central servers ($i_k$), its other application servers ($x_k$) and its DBMS server ($d_k$), so as to minimize the total cost of the server farm, given by the cost of the central server ($c_k \cdot i_k$), the sum of the costs of the other application servers ($c_k \cdot x_k$), and the cost of the DBMS server ($c_k \cdot d_k$).

The target function is subjected to a number of constraints. Particularly, the constraints for the application servers are:

$$x_k \in N_0 \; \forall k \in K \quad (2a)$$

$$z_k \in \{0, 1\} \; \forall k \in K \quad (2b)$$

$$x_k \geq z_k \; \forall k \in K \quad (2c)$$

$$n \cdot z_k \geq x_k \; \forall k \in K \quad (2d)$$

$$i_k \in [0, 1] \; \forall k \in K \quad (2e)$$

$$\sum_{k \in K} i_k = 1 \quad (2f)$$

$$\sum_{k \in K} s_k (x_k + i_k) \geq r_L \cdot s_R \quad (2g)$$

$$m_k \cdot x_k \geq m_R^A \frac{s_k \cdot x_k}{\sum_{q \in K} s_q (x_q + i_q)} \; \forall k \in K \quad (2h)$$

$$\sum_{k \in K} m_k \cdot i_k \geq m_R^A \frac{\sum_{k \in K} s_k \cdot x_k}{\sum_{k \in K} s_k (x_k + i_k)} \quad (2i)$$

As above, the constraint (2a) indicates that the number of the available servers of each type to be used as application servers (different from the central server) is an integer.

The constraint (2b) indicates that the auxiliary flag $z_k$ is zero or one. The constraints (2c) and (2d) define the auxiliary flag $z_k$ in terms of the decisional variable $x_k$ (where n is the maximum number of available servers of the k-th type that might be used in the server farm). In this way, $z_k=1$ when $x_k>0$ (i.e., when the available servers of the k-th type are used as one or more application servers different from the central server), whereas $z_k=0$ when $x_k=0$.

The constraint (2e) indicates that the number of the available servers of each type to be used as central server is zero or one. The constraint (2f) indicates that the server farm includes a single central server.

As above, the constraint (2g) indicates that the sum of the available powers of all the application servers (including the central server) must be at least equal to the required power for the application instances. Moreover, the constraints (2h) and (2i) indicates that the available memory of each application server (different from the central instance) and of the central instance, respectively, must be at least equal to a value, which is proportional to the whole required memory for the application instances according to its available power (with respect to the whole available power of all the application servers—including the central server).

Moreover, the constraints for the DBMS server are:

$$d_k \in \{0, 1\} \; \forall k \in K \quad (2j)$$

$$\sum_{k \in K} d_k = 1 \quad (2k)$$

$$\sum_{k \in K} s_k \cdot d_k \geq (1 - r_L) \cdot s_R \quad (2l)$$

$$\sum_{k \in K} m_k \cdot d_k \geq m_R^D \quad (2m)$$

The constraint (2j), (2k), (2l) and (2m) are exactly the same as the above-described constraints (1d), (1e), (1f) and (1g) for the model 1.

The high-reliability requirement adds the following further constraints. Particularly, the constraint for the cluster of the central server and the DBMS server is:

$$\sum_{k \in K} s_k \cdot i_k \geq (1 - r_L) \cdot r_F \cdot s_R \quad (2n)$$

The constraint (2n) indicates that the available power of the central server must be at least equal to the acceptable power for the DBMS instance (i.e., the required power minus the acceptable power decrease, so as to ensure the desired performance even when the DBMS instance moves to the central server because of a failure of DBMS server.

The following constraints instead relates to the failure of an application server, simulated by the auxiliary flag $z_k$:

$$\sum_{k \in K} s_k(x_k + i_k) - s_j \cdot x_j \geq r_F \cdot r_L \cdot s_R \quad \forall\, j \in K \tag{2o}$$

$$m_k \cdot x_k \geq m_R^A \frac{s_k \cdot x_k}{\sum_{q \in K} s_q(x_q + i_q) - s_j \cdot z_j} \quad \forall\, j, k(k <> j) \in K \tag{2p}$$

$$\sum_{k \in K} m_k \cdot i_k \geq m_R^A \frac{\sum_{k \in K} s_k \cdot i_k}{\sum_{k \in K} s_k(x_k + i_k) - s_j \cdot z_j} \quad \forall\, j \in K \tag{2q}$$

The constraint (2o) derives from the constraint (2g). The constraint (2o) further indicates that the sum of the available powers of all the application servers (including the central server) minus the failed application server must be at least equal to the required power for the application instances with the acceptable power decrease. On the other hand, the constraints (2p) and (2q) derive from the constraints (2h) and (2i), respectively. The constraints (2p) and (2q) indicate that the available memory of each application server (different from the central instance) and of the central instance, respectively, must be at least equal to a value, which is proportional to the whole required memory for the application instances according to its available power (with respect to the whole available power of the remaining application servers, including the central server). It should be noted that the constraints (2p) and (2q) dominate the constraints (2h) and (2i), which are then inactive during the optimization process.

The constraints for the failure of the central server are:

$$\sum_{k \in K} s_k(x_k + d_k) \geq r_F \cdot s_R \tag{2r}$$

$$m_k \cdot x_k \geq m_R^A \frac{s_k \cdot x_k}{\sum_{q \in K} s_q(x_q + i_q) - (1 - r_L) \cdot r_F \cdot s_R} \quad \forall\, k \in K \tag{2s}$$

$$\sum_{k \in K} m_k \cdot d_k \geq m_R^D + m_k^A \frac{\sum_{k \in K} s_k \cdot d_k - (1 - r_L) \cdot r_F \cdot s_R}{\sum_{k \in K} s_k(x_k + i_k) - (1 - r_L) \cdot r_F \cdot s_R} \tag{2r}$$

The constraint (2r) derives from the extended form:

$$\sum_{k \in K} s_k(x_k + d_k) - (1 - r_L) \cdot r_F \cdot s_R \geq r_F \cdot r_L \cdot s_R,$$

which indicates that the sum of the available powers of all the application servers (different from the central server) and the DBMS server, with the subtraction of the required power of the DBMS instance, must be at least equal to the acceptable power for the application instances (so as to ensure the desired performance even when the central instance moves to the DBMS server). The constraint (2s) derives from the constraint (2h). The constraint (2s) indicates that the available memory of each application server (different from the central instance) must be at least equal to the a value, which is proportional to the whole required memory for the application instances according to its available power (with respect to the whole available power of the all application servers with the subtraction of the acceptable power for the DBMS instance). The constraint (2r) derives from the constraint (2m). The constraints (2r) indicates that the available memory of the DBMS server must be at least equal to the required memory for the DBMS instance plus the one required by the central instance (proportional to its acceptable power); in this case a well, the constraint (2r) dominates the constraint (2m), which is then inactive during the optimization process.

At the end, similar constraints are required for the failure of the DBMS server:

$$\sum_{k \in K} s_k(x_k + i_k) \geq r_F \cdot s_R \tag{2t}$$

$$m_k \cdot x_k \geq m_R^A \frac{s_k \cdot x_k}{\sum_{q \in K} s_q(x_q + i_q) - (1 - r_L) \cdot r_F \cdot s_R} \quad \forall\, k \in K \tag{2u}$$

$$\sum_{k \in K} m_k \cdot d_k \geq m_R^D + m_k^A \frac{\sum_{k \in K} s_k \cdot d_k - (1 - r_L) \cdot r_F \cdot s_R}{\sum_{k \in K} s_k(x_k + i_k) - (1 - r_L) \cdot r_F \cdot s_R} \tag{2v}$$

Many practical implementations require that the cluster of the central server and the DBMS server should be homogeneous (i.e., with the two servers of the same type). In this case, the optimization process may be simplified as follow.

Particularly, the model still requires the decisional variables $x_k$ and $z_k$. Conversely, a single decisional variable is now used for the central server and the DBMS server:

$t_k$: flag indicating whether the available servers of the k-th type are used for the cluster.

Therefore, the target function becomes:

$$\min \sum_{k \in K} c_k \cdot (x_k + 2 \cdot t_k)$$

Moreover, the corresponding constraints are simplified as:

$$x_k \in N_0 \quad \forall\, k \in K \tag{2a'}$$

$$z_k \in \{0, 1\} \quad \forall\, k \in K \tag{2b'}$$

$$x_k \geq z_k \quad \forall\, k \in K \tag{2c'}$$

$$n \cdot z_k \geq x_k \quad \forall\, k \in K \tag{2d'}$$

$$\sum_{k \in K} (s_k \cdot x_k + s_k \cdot t_k) \geq r_L \cdot s_I \tag{2g'}$$

$$m_k \cdot x_k \geq m_R^A \frac{s_k \cdot x_k}{\sum_{q \in K} s_q(x_q + t_q)} \quad \forall\, k \in K \tag{2h'}$$

$$\sum_{k \in K} m_k \cdot t_k \geq m_R^A \frac{\sum_{k \in K} s_k \cdot t_k}{\sum_{k \in K} s_k(x_k \cdot t_k)} \tag{2i'}$$

$$t_k \in \{0, 1\} \quad \forall\, k \in K \tag{2j'}$$

$$\sum_{k \in K} t_k = 1 \tag{2k'}$$

$$\sum_{k \in K} s_k \cdot t_k \geq (1 - r_L) \cdot s_R \tag{2l'}$$

-continued $$\sum_{k \in K} m_k \cdot t_k \geq m_R^D \quad (2m')$$

$$\sum_{k \in K} s_k \cdot t_k \geq (1 - r_L) \cdot s_R \quad (2n')$$

$$\sum_{k \in K} s_k(x_k + t_k) - s_j \cdot x_j \geq r_F \cdot r_L \cdot s_R \quad \forall j \in K \quad (2o')$$

$$m_k \cdot x_k \geq m_R^A \frac{s_k \cdot x_k}{\sum_{k \in K} s_k(x_k + t_k) - s_j \cdot z_j} \quad \forall j, k (k \neq j) \in K \quad (2p')$$

$$\sum_{k \in K} m_k \cdot t_k \geq m_R^A \frac{\sum_{k \in K} s_k \cdot t_k}{\sum_{k \in K} s_k \cdot (x_k + t_k) - s_j \cdot z_j} \quad \forall j \in K \quad (2q')$$

$$\sum_{k \in K} s_k(x_k + t_k) \geq r_F \cdot s_R \quad (2r')$$

$$m_k \cdot x_k \geq m_R^A \frac{s_k \cdot x_k}{\sum_{q \in K} s_q(x_q + t_q) - (1 - r_L) \cdot r_F \cdot s_R} \quad \forall k \in K \quad (2s')$$

$$\sum_{k \in K} m_k \cdot t_k \geq m_R^D + m_k^A \frac{\sum_{k \in K} s_k \cdot t_k - (1 - r_L) \cdot r_F \cdot s_R}{\sum_{k \in K} s_k(x_k + t_k) - (1 - r_L) \cdot r_F \cdot s_R} \quad (2r')$$

More in detail, the constraint (2n) is reformulated as:

$$\sum_{k \in K} s_k \cdot t_k \geq (1 - r_L) \cdot r_F \cdot s_R,$$

and then simplified into the constraint (2n') since $r_F < 1$. Moreover, the set of constraints (2r), (2s), (2r), for the failure of the central server, and the set of constraints (2t), (2u), (2v), for the failure of the DBMS server, collapses into the single set of constraints (2r'), (2s'), (2r'), for both of them.

As above, the model so obtained (for either the non-homogenous cluster or the homogeneous cluster) is not linear. Therefore, in this case as well the solution of the model may be simplified by means of a similar linearization technique or a similar iterative procedure.

Model 3

Figure 4B:
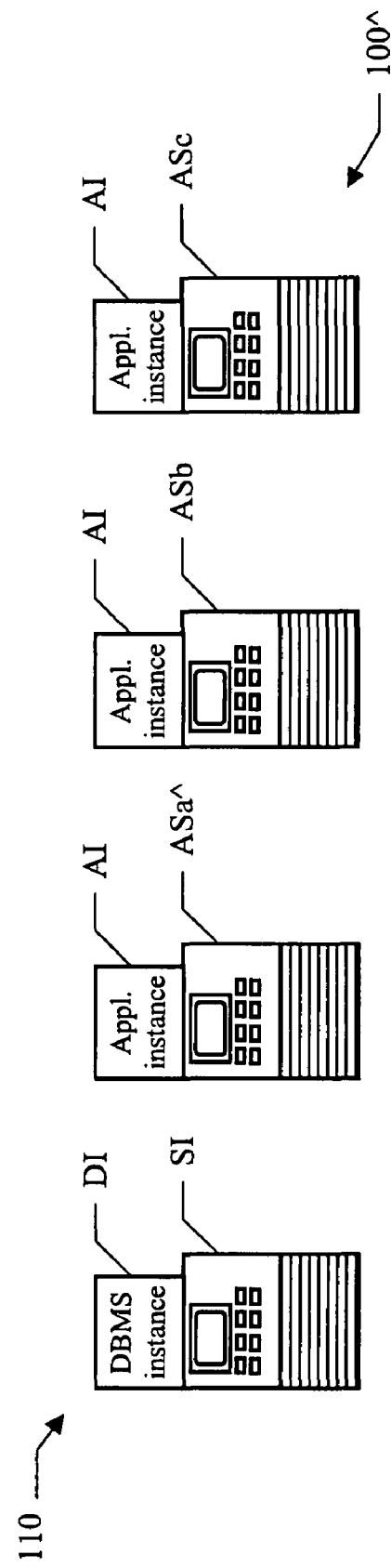

The third model relates to the scalability scenario illustrated in FIGS. 4a-4b.

The model requires the same input parameters as the model 1 at the current time ($t_0$), differentiated with the addition of the same index 0:

$K^0$: types of available servers at the time $t_0$;

$c_k^0$: cost of the available servers of the k-th type ($k \in K^0$);

$s_k^0$: available power of the available servers of the k-th type ($k \in K^0$);

$m_k^0$: available memory of the available servers of the k-th type ($k \in K^0$);

$s_R^0$: required power for the SAP application at the time $t_0$;

$r_L^0$: load ratio at the time $t_0$;

$m_R^{D0}$: required memory for the DBMS instance at the time $t_0$; and $m_R^{A0}$: required memory for the application instances at the time $t_0$.

Additional input parameters at the next time ($t_1 > t_0$) are differentiated by means of the same index 1:

$K^1$: types of available servers at the time $t_0$;

$H(k)$: types of available servers at the time $t_1$ that can be obtained by upgrading the available servers of the k-th type ($k \in K^0$) at the time $t_0$;

$c_k^1$: cost of the available servers of the h-th type ($h \in K^1$);

$cu_{hk}$: cost of the upgrade to the available servers of the h-th type at the time $t_1$, with $h \in H(k)$, from the available servers of the k-th type ($k \in K^0$) at the time $t_0$;

$s_h^1$: available power of the available servers of the h-th type;

$su_{hk}$: difference of the available power between the available servers of the h-th type at the time $t_1$, with $h \in H(k)$, and the available servers of the k-th type ($k \in K^0$) at the time $t_0$;

$m_h^1$: available memory of the available servers of the h-th type;

$mu_{hk}$: difference of the available memory between the available servers of the h-th type at the time $t_1$, with $h \in H(k)$, and the available servers of the k-th type ($k \in K^0$) at the time $t_0$;

$s_R^1$: required power for the SAP application at the time $t_1$;

$r_L^1$: load ratio at the time $t_1$;

$m_R^{D1}$: required memory for the DBMS instance at the time $t_1$; and $m_R^{A1}$: required memory for the application instances at the time $t_1$.

The costs $c_h^1$, $cu_{hk}$ are determined according to the information estimated for the time $t_1$; these values are then actualized at the time $t_0$ (such as by means of the well-known Present Value function—for example, based on an actualization rate of 4-6%).

The decisional variables of the model are:

$x_k^0$: number of the available servers of the k-th type ($k \in K^0$) to be used as application servers at the time $t_0$;

$x_h^1$: number of the available servers of the h-th type ($h \in K^1$) to be used as application servers at the time $t_1$;

$w_k^0$: number of the available servers of the k-th type ($k \in K^0$) used as application servers at both the times $t_0$ and $t_1$ (i.e., they are acquired at the time $t_0$ and kept at the time $t_1$ as well, possibly upgraded);

$z_{hk}$: number of the available servers of the h-th type at the time $t_1$, with $h \in H(k)$, obtained by upgrading the available servers of the k-th type at the time $t_0$ ($k \in K^0$)—for the application servers;

$d_k^0$: number of the available servers of the k-th type ($k \in K^0$) to be used as DBMS server at the time $t_0$;

$d_h^1$: number of the available servers of the h-th type ($h \in K^1$) to be used as DBMS server at the time $t_1$;

$u_k^0$: number of the available servers of the k-th type used as DBMS server at both the times $t_0$ and $t_1$ (possibly upgraded);

$v_{hk}$: number of the available servers of the h-th type at the time $t_1$, with $h \in H(k)$, obtained by upgrading the available servers of the k-th type at the time $t_0$ ($k \in K^0$)—for the DBMS server.

The model is defined by the following target function:

$$\min \left( \begin{array}{l} \sum_{k \in K^O} c_k^0 \cdot x_k^0 + \sum_{h \in K^1} c_h^1 \cdot x_h^1 + \sum_{k \in K^O} \sum_{h \in H(k)} cu_{hk} \cdot z_{hk} + \\ \sum_{k \in K^O} c_k^0 \cdot d_k^0 + \sum_{h \in K^1} c_h^1 \cdot d_h^1 + \sum_{k \in K^O} \sum_{h \in H(k)} cu_{hk} \cdot v_{hk} \end{array} \right)$$

that identifies the optimal configuration of the server farm minimizing its total cost. The total cost includes the sum of the costs of the application servers at the time $t_0$ ($c_k^0 \cdot x_k^0$), the sum of the costs of the application servers added at the time $t_1$ ($c_h^1 \cdot x_h^1$), and the sum of the costs of the application servers upgraded at the time $t_1$ from the ones already available at the time $t_o$ ($cu_{hk} \cdot z_{hk}$). Likewise, the total cost also includes the cost of the DBMS server at the time $t_0$ ($c_k^0 \cdot d_k^0$), the cost of the DBMS server replaced at the time $t_1$ ($c_h^1 \cdot d_h^1$), and the cost of the DBMS server upgraded at the time $t_1$ from the one already available at the time $t_0$ ($cu_{hk} \cdot v_{hk}$).

The target function is subjected to a number of constraints. Particularly, the constraints for the application servers are:

$$x_k^0, x_h^1, w_k^0, z_{hk} \in N_0 \; \forall \, k \in K^O, h \in K^1 \tag{3a}$$

$$w_k^0 [x_k^0 \; \forall \, k \in K^O \tag{3b}$$

$$\sum_{h \in H(k)} z_{hk} \le w_k^0 \; \forall \, k \in K^O \tag{3c}$$

$$\sum_{k \in K^O} s_k^0 \cdot x_k^0 \ge r_L^0 \cdot s_r^0 \tag{3d}$$

$$\sum_{k \in K^O} s_k^0 \cdot w_k^0 + \sum_{h \in K^1} s_h^1 \cdot x_h^1 + \sum_{k \in K^O} \sum_{h \in H(k)} su_{hk} \cdot z_{hk} \ge r_L^1 \cdot s. \tag{3e}$$

$$m_k^0 \cdot x_k^0 \ge m_R^{A0} \frac{s_k^0 \cdot x_k^0}{\sum_{q \in K^O} s_q^0 \cdot x_q^0} \; \forall \, k \in K^O \tag{3f}$$

$$m_h^1 \cdot x_h^1 \ge m_R^{A1} \frac{s_h^1 \cdot x_h^1}{A} \; \forall \, h \in K^1 \tag{3g}$$

where $A = \underset{k c K^O}{S} s_k^0 \$ w_k^0 + \underset{h c K^1}{S} s_h^1 \$ x_h^1 + \underset{k c K^O}{S} \underset{h c H(k)}{S} su_{hk} \$ z_{hk}$ $$m_k^0 \$ \left( w_k^0 - \underset{h c H(k)}{S} z_{hk} \right) mm_R^{A1} \frac{s_k^0 \left( w_k^0 - \underset{h c H(k)}{S} z_{hk} \right)}{A} \; \forall \, k \in K^0 \tag{3h}$$

$$(m_k^0 + mu_{hk}) \cdot z_{hk} \ge m_R^{A1} \frac{(s_k^0 + su_{hk}) \cdot z_{hk}}{A} \; \forall \, k \in K^O, h \in H(k) \tag{3i}$$

For each type of available servers (with reference to the use as application servers), the constraint (3a) indicates that the number of the available servers acquired either at the time $t_o$ or at the time $t_1$, the number of the available servers kept at both the times $t_o$–$t_1$, and the number of the available servers upgraded from the time $t_0$ the time $t_1$ is an integer. Moreover, the constraint (3b) indicates that the number of the available servers kept at the time $t_1$ cannot exceed the number of the available servers of the same type at the time $t_o$. Likewise, the constraint (3c) indicates that the number of the available servers upgraded from the time $t_0$ the time $t_1$ cannot exceed the number of the servers of the same type being kept.

As above, for the time $t_0$ the constraint (3d) indicates that the sum of the available powers of all the application servers must be at least equal to the required power for the application instances. For the time $t_1$, instead, the constraint (3e) indicates that the same condition must be satisfied by the sum of the available powers of all the application servers already available at the time $t_0$, considering their original available powers if upgraded ($s_k^0 \cdot w_k^0$), all the application servers added at the time $t_1$ ($s_h^1 \cdot x_h^1$) and all the application servers upgraded from the time $t_0$ the time $t_1$, only considering their additional available powers ($su_{hk} \cdot z_{hk}$). Likewise, for the time $t_0$ the constraint (3f) indicates that the available memory of each application server must be at least equal to a value, which is proportional to the whole required memory for the application instances according to its available power (with respect to the whole available power of all the application servers). For the time $t_1$, the constraint (3g) indicates the same condition for the application servers added at the time $t_1$, In this case, the whole available power of all the application servers is defined by taking into account the application servers already available at the time $t_0$ (original available powers if upgraded), the application servers added at the time $t_1$, and the application servers upgraded from the time $t_0$ the time $t_1$ (only additional available powers). Moreover, the constraint (3h) indicates the same condition for the application servers kept at both the times $t_0$-$t_1$ without any upgrade. At the end, the constraint (3i) indicates the same condition for the application servers kept at both the times $t_0$-$t_1$ but upgraded (from the time $t_0$ the time $t_1$).

Moreover, the constraints for the DBMS server are:

$$d_k^0, d_h^1, u_k^0, v_{hk} \in \{0, 1\} \; \forall \, k \in K^O, h \in K^1 \tag{3j}$$

$$\sum_{k \in K^O} d_k^0 = 1 \tag{3k}$$

$$\sum_{k \in K^O} u_k^0 + \sum_{h \in K^1} d_h^1 = 1 \tag{3l}$$

$$u_k^0 \le d_k^0 \; \forall \, k \in K^O \tag{3m}$$

$$\sum_{h \in H(k)} v_h^0 \le u_k^0 \; \forall \, k \in K^O \tag{3n}$$

$$\underset{k c K^0}{S} s_k^0 \cdot \$ d_k^0 m (1 - r_L^0) \$ s_R^0 \tag{3o}$$

$$\sum_{k \in K^O} s_k^0 \cdot u_k^0 + \sum_{h \in K^1} s_h^1 \cdot d_h^1 + \sum_{k \in K^O} \sum_{h \in H(k)} su_{hk} \cdot v_{hk} \ge (1 - r_L^1) \cdot s_R^1 \tag{3p}$$

$$\sum_{k \in K^O} m_k^0 \cdot d_k \ge m_R^{D0} \tag{3q}$$

$$\underset{k c K^0}{S} m_k^0 \$ u_k^0 + \underset{h c K^1}{S} m_h^1 \$ d_h^1 + \underset{k c K^0}{S} \underset{h c H(k)}{S} mu_{hk} \$ v_{hk} mm_R^L \tag{3r}$$

For each type of available servers, the constraint (3j) indicates that zero or one DBMS server can be acquired either at the time $t_o$ or at the time $t_1$, can be kept at both the times $t_o$-$t_1$, and can be upgraded from the time $t_0$ the time $t_1$. The constraint (3k) indicates that the server farm includes a single DBMS server at the time $t_0$. Likewise, the constraint (3l) indicates the same condition at the time $t_1$. The constraint (3m) indicates that the DBMS server kept at both the times $t_0$-$t_1$ must be of the same type of the one acquired at the time $t_o$. Likewise, the constraint (3n) indicates that the DBMS server upgraded from the time $t_0$ the time $t_1$ must be of the same type of the one being kept.

As above, for the time $t_0$ the constraint (3o) indicates that the available power of the DBMS server must be at least equal to the required power for the DBMS instance. For the time $t_1$, instead, the constraint (3p) indicates that the same condition must be satisfied by the available power of the DBMS server already available at the time $t_0$, considering its original available power if upgraded, the DBMS server changed at the time $t_1$, and the DBMS server upgraded from the time $t_0$ the time $t_1$, only considering its additional available power. Likewise, for the time $t_0$ the constraint (3q) indicates that the available memory of the DBMS server must at least equal to the required memory for the DBMS instance. For the time $t_1$, the constraint (3r) indicates that the same condition must be satisfied by the available memory of the DBMS server already available at the time $t_0$ (original available memory if upgraded), the DBMS server changed at the time $t_1$, and the DBMS server upgraded from the time $t_0$ the time $t_1$ (only additional available memory).

As above, the model so obtained is not linear. Therefore, in this case as well the solution of the model may be simplified by means of a similar linearization technique or a similar iterative procedure.

Model 4

The fourth model relates to the consolidation scenario illustrated in FIG. 5.

The model requires the same input parameters defining the available servers as in the model 1 (i.e., K and $c_k$, $s_k$, $m_k$ for $k \in K$). The model also requires similar input parameters for each SAP application to be hosted on the server farm, differentiated with the addition of an index j (with j=1 ... M, where M is the number of the SAP applications):

$s_{Rj}$: required power for the j-th SAP application;

$r_{Lj}$: load ratio for the j-th SAP application;

$m_R^D{}_j$: required memory for the DBMS instance of the j-th SAP application; and $m_R^A{}_j$: required memory for the application instances of the j-th SAP application.

If we denote with I the set of the (optimal) servers in the optimal configuration of the server farm, the model requires the following decisional variables:

$y_{ijk}$: portion of the available power in the i-th optimal server ($i \in I$) of the k-th type ($k \in K$) assigned to the application servers of the j-th SAP application ($j \in T$);

$d_{ijk}$: portion of the available power in the i-th optimal server of the k-th type assigned to the DBMS server of the j-th SAP application;

$x_{ik}$: flag indicating whether the i-th optimal server is of the k-th type;

$z_{ijk}$: flag indicating whether the DBMS server of the j-th SAP application is hosted on the i-th optimal server of the k-th type.

The model is defined by the following target function:

$$\min \sum_{i \in I} \sum_{k \in K} c_k \cdot x_{ik}$$

based on the cost of all the optimal servers included in the server farm.

The target function is subjected to a number of constraints. Particularly, the constraints for the application servers are:

$$0 \leq y_{ijk} \leq 1, 0 \leq d_{ijk} \leq 1 \quad \forall i \in I, j \in J, k \in K \tag{4a}$$

$$x_{ik}, z_{ijk} \in \{0, 1\} \quad \forall i \in I, j \in J, k \in K \tag{4b}$$

-continued $$x_{ik} \geq \sum_{i \in I} y_{ijk} + \sum_{i \in I} d_{ijk} \quad \forall i \in I, k \in K \tag{4c}$$

$$z_{ijk} \geq d_{ijk} \quad \forall i \in I, j \in J, k \in K \tag{4d}$$

$$\sum_{k \in K} x_{ik} \leq 1 \quad \forall i \in I \tag{4e}$$

$$\sum_{k \in K} x_{i+1,k} \leq \sum_{k \in K} x_{ik} \quad \forall i (i < i_{max}) \tag{4f}$$

$$\sum_{i \in I} \sum_{k \in K} z_{ik} = 1 \quad j \in J \tag{4g}$$

The constraint (4a) indicates that the portions of the available power of each optimal server assigned to the application instances ($y_{ijk}$) and to the DBMS instance ($d_{ijk}$) of each SAP application is a real number ranging from 0 (when no SAP application is housed thereon) to 1 (when the whole optimal server is dedicated thereto). Moreover, the constraint (4b) indicates that the flags $x_{ik}$ and $z_{ijk}$ are zero or one.

The constraint (4c) defines the flag $x_{ik}$ in terms of the decisional variables $y_{ijk}$ and $d_{ijk}$, with $x_{ik}=1$ when $y_{ijk}$ and/or $d_{ijk}$ are different from zero (i.e., the optimal server hosts at least one application instance or DBMS instance). Likewise, the constraint (4d) defines the flag $z_{ik}$ in terms of the decisional variable $d_{ijk}$, with $z_{ik}=1$ when $d_{ijk}>0$ (i.e., the optimal server hosts the relevant DBMS instance). Moreover, the constraint (4e) ensures that a single type is associated with each optimal server. The constraint (4f) establishes a predefined order for the types of the optimal servers, considering that their position does not alter the configuration of the server farm. However, this strongly reduces the number of permutations to be taken into account during the optimization process (and then its computational complexity). At the end, the constraint (4g) indicates that each SAP application has a single DBMS instance.

The problem of the consolidation adds the following constraints:

$$\sum_{i \in I} \sum_{k \in K} s_k \cdot y_{ijk} \geq r_{jL} \cdot s_{jR} \quad j \in J \tag{4h}$$

$$\sum_{i \in I} \sum_{k \in K} s_k \cdot d_{ijk} \geq (1 - r_{jL}) \cdot s_{jR} \quad j \in J \tag{4i}$$

$$\sum_{j \in J} (y_{ijk} + d_{ijk}) \leq 1 \quad i \in I, k \in K \tag{4j}$$

$$\sum_{j \in K} m_k \cdot x_{ik} \geq \sum_{j \in J} \left( \frac{s_k \cdot y_{ijk}}{\sum_{p \in I} \sum_{q \in K} s_q \cdot y_{pjq}} m_{jR}^A + m_{jR}^D \cdot z_{ijk} \right) \quad i \in I, k \in K \tag{4k}$$

For each SAP application, the constraint (4h) indicates that the sum of the available powers of all the application servers (for any system) must be at least equal to the required power for the application instances. Likewise, the constraint (4i) indicates that the available power of the DBMS server (for any system) must be at least equal to the required power for the DBMS instance. The constraint (4j) ensures that the power allocated on each optimal server to all the SAP applications (for their application instances and/or DBMS instance) does not exceed its available power. In any case, the constraint (4j) is redundant with respect to the constraints (4c)

and (4e), so that it is inactive during the optimization process. At the end, the constraint (4k) indicates that the available memory of each optimal server must be at least equal to the memory assigned to each application instance (distributed as above according to the available power) and to each DBMS server hosted thereon.

The model described above is of the Mixed Integer Programming (MIP) type. In order to simplify its solution, an approach based on a Set Covering (SC) technique is exploited.

The proposed algorithm involves three different steps. Particularly, in a first step a pre-optimization process is performed. In this phase, there are calculated a plurality of optimal configurations for different pairs of (sample) required power and required memory, which configurations are homogenous (i.e., with all the servers of the same type). The required power and the required memory are chosen so as to span over a reasonable range with a predefined pitch. For example, it is possible to take into account the required powers from 50 SAPSs to 100 k SAPSs at steps of 50 SAPSs and the required memories from 50 Gbytes to 50 Tbytes at steps of 50 Gbytes. All the possible combinations of required power/required memory may be represented with a pre-optimization matrix, which has the required powers on the axis of the abscissas, the required memories on the axis of the ordinates, and the (optimal) homogeneous configurations satisfying those requirements in the corresponding cells. Each homogeneous configuration is defined by the type of the available servers being chosen and by their number (together with the total cost of the homogeneous configuration).

For each pair of required power/required memory, the homogeneous configuration is calculated by applying a simplified version of the model 1 without the constraints relating to the DBMS instance (since in this phase the allocation of the application/DBMS instances on the available servers is not relevant). For this purpose, the following decisional variables are used:

$x_k$: number of the available servers of the k-th type to be used in the homogeneous configuration; and $z_k$: flag indicating whether the available servers of the k-th type have been chosen for the homogeneous configuration.

Therefore, the target function becomes:

$$\min \sum_{k \in K} c_k \cdot x_k$$

Moreover, the corresponding constraints are simplified as:

$$x_k \in N_0 \quad \forall k \in K \quad (4a')$$

$$z_k \in \{0, 1\} \quad \forall k \in K \quad (4b')$$

$$x_k \geq z_k \quad \forall k \in K \quad (4c')$$

$$n \cdot z_k \geq x_k \quad \forall k \in K \quad (4d')$$

$$\sum_{k \in K} z_k = 1 \quad (4e')$$

$$\sum_{k \in K} s_k \cdot x_k \geq s_R \quad (4f')$$

$$m_k \cdot x_k \geq (m_R^A + m_R^D) \cdot z_k \quad \forall k \in K \quad (4g')$$

As above, the constraint (4a') indicates that the number of available servers of each type to be used in the homogeneous configuration is an integer. The constraint (4b') indicates that the auxiliary flag $z_k$ is zero or one. The constraints (4c') and (4d') define the auxiliary flag $z_k$ in terms of the decisional variable $x_k$ (where n is the maximum number of available servers of the k-th type that might be used in the server farm). In this way, $z_k=1$ when $x_k>0$ (i.e., when the available servers of the k-th type are chosen for the homogeneous configuration), whereas $z_k=0$ when $x_k=0$. Moreover, the constraint (4e') indicates that the servers of the homogeneous configuration are all of the same type.

The constraint (4f') derives from the constraint (1b) for the model 1, now indicating that the sum of the available powers of all the (application and DBMS) servers must be at least equal to the required power for the whole SAP application. The constraint (4g') derives from the constraint (1c) of the same model 1. In this case (being all the servers of the same type), the constraint (4g') is simplified by indicating that the sum of the available memories of all the (application and DBMS) servers must be at least equal to the required memory for the SAP application.

Therefore, the model so obtained is already linear (and then with a reduced computational complexity). However, the same model must be solved for every cell of the pre-optimization matrix (i.e., for every pair of required power and required memory). Therefore, the pre-optimization process requires a relatively long time. However, this process is performed only once in a completely automatic manner, i.e., with a batch procedure (whenever the types of available servers change).

In a second step of the optimization process, the M SAP applications are distributed on the homogeneous configurations of the pre-optimization matrix, so as to determine their partitioning that minimizes the corresponding total cost.

The process requires the following input parameters:

A: partitioning matrix having Ar rows and Ac columns of flags. For each SAP application, the partitioning matrix A includes a pair of rows for its DBMS instance and for all its application instances, respectively (with Ar=2·M). Moreover, the partitioning matrix A includes a column for every possible partitioning of the SAP applications; the partitioning is defined by the value of the flags, which identify the DBMS instance and/or application instances of the different SAP applications to be consolidated on a same homogeneous configuration. Therefore, the columns of the partitioning matrix A will consist of all the possible combinations of values of its cells, with the exception of the one with all the flags deasserted (with Ac=$2^{Ar}-1$). It should be noted that each row of the partitioning matrix A has at least one flag asserted (to indicate that the DBMS instance/set of application instances of each SAP applications is distributed on at least one homogeneous configuration).

C: cost vector having Ac elements, each one indicating the total cost for the homogeneous configuration identified by the corresponding column in the partitioning matrix A. Each element of the cost vector C is calculated by determining the required power and the required memory of the corresponding partitioning (equal to the sum of the required powers and the required memories, respectively, of the DBMS/application instances included in the partitioning, as indicated by the flags of the column in the partitioning matrix A). These values are then used to access the pre-optimization matrix so as to extract the total cost of the homogenous configuration having the required available power and available memory.

The decisional variable of the model is:

X: vector of flags selecting one or more columns in the partitioning matrix A.

The model is defined by the following target function:

$$\min C^T X$$

In other words, the target function is used to identify the optimal partitioning of the SAP applications on the homogeneous configurations, which minimizes the total cost of the server farm. Each optimal partitioning then consists of at least one DBMS instance and/or set of application instances of the different SAP applications.

For each optimal partitioning, in the third step there is calculated, for the partitioning as a whole, the required power (by summing the required powers of all the DBMS/application instances of the different SAP applications), the load ratio (by dividing the sum of the required powers of all the application instances of the different SAP applications by the required power of the partitioning), the required memory for the DBMS instances (by summing the required memories of all the DBMS instances of the different SAP applications), and the required memory for the application instances (by summing the required memories of all the application instances of the different SAP applications).

The values so obtained are then used to calculate the corresponding optimal configuration (now heterogeneous), which satisfies the requirements of the optimal partitioning as a whole. For this purpose, there is applied the model 1 described above. It should be noted that when the optimal partitioning does not include any DBMS instance, the model 1 can be simplified by removing the corresponding decisional variable with its constraints.

The heterogeneous configurations so obtained for the different optimal partitioning together define the optimal configuration of the server farm that optimizes the total cost for the consolidation of the different SAP applications.

Alternatively, it is possible to calculate the pre-optimization matrix by relaxing the constraint of the homogeneity of the corresponding configurations. In this way, the computational complexity of the first step of the process is slightly increased. However, it is now possible to avoid the third step (since the optimal partitioning determined at the second step are already heterogeneous).

In this case, each (optimal) heterogeneous configuration in the pre-optimization matrix will be defined by the number of each type of servers included therein (together with its total cost). For each pair of required power/required memory, the heterogeneous configuration is again calculated by applying a simplified version of the model 1 without the constraints relating to the DBMS instance. The model now only requires the decisional variable:

$x_k$: number of the available servers of the k-th type to be used in the heterogeneous configuration.

As above, the target function is:

$$\min \sum_{k \in K} c_k \cdot x_k$$

Moreover, the corresponding constraints are:

$$x_k \in N_0 \quad \forall k \in K \qquad (4a''')$$

$$\sum_{k \in K} s_k \cdot x_k \geq s_R \qquad (4b''')$$

$$m_k \cdot x_k \geq (m_R^A + m_R^D) \frac{s_k \cdot x_k}{\sum_{q \in K} s_q \cdot x_q} \quad \forall k \in K \qquad (4c''')$$

As above, the constraint (4a''') indicates that the number of available servers of each type to be used in the heterogeneous configuration is an integer. The constraint (4b''') indicates that the sum of the available powers of all the (application and DBMS) servers must be at least equal to the required power for the whole SAP application. At the end, the constraint (4c''') indicates that the available memory of each (application or DBMS) server must be at least equal to a value, which is proportional to the whole required memory for the (application and DBMS) instances according to its available power (with respect to the whole available power of all the servers).

The model so obtained is again not linear, so that it can be solved by applying the above-described linearization technique or iterative procedure.

Figure 6:
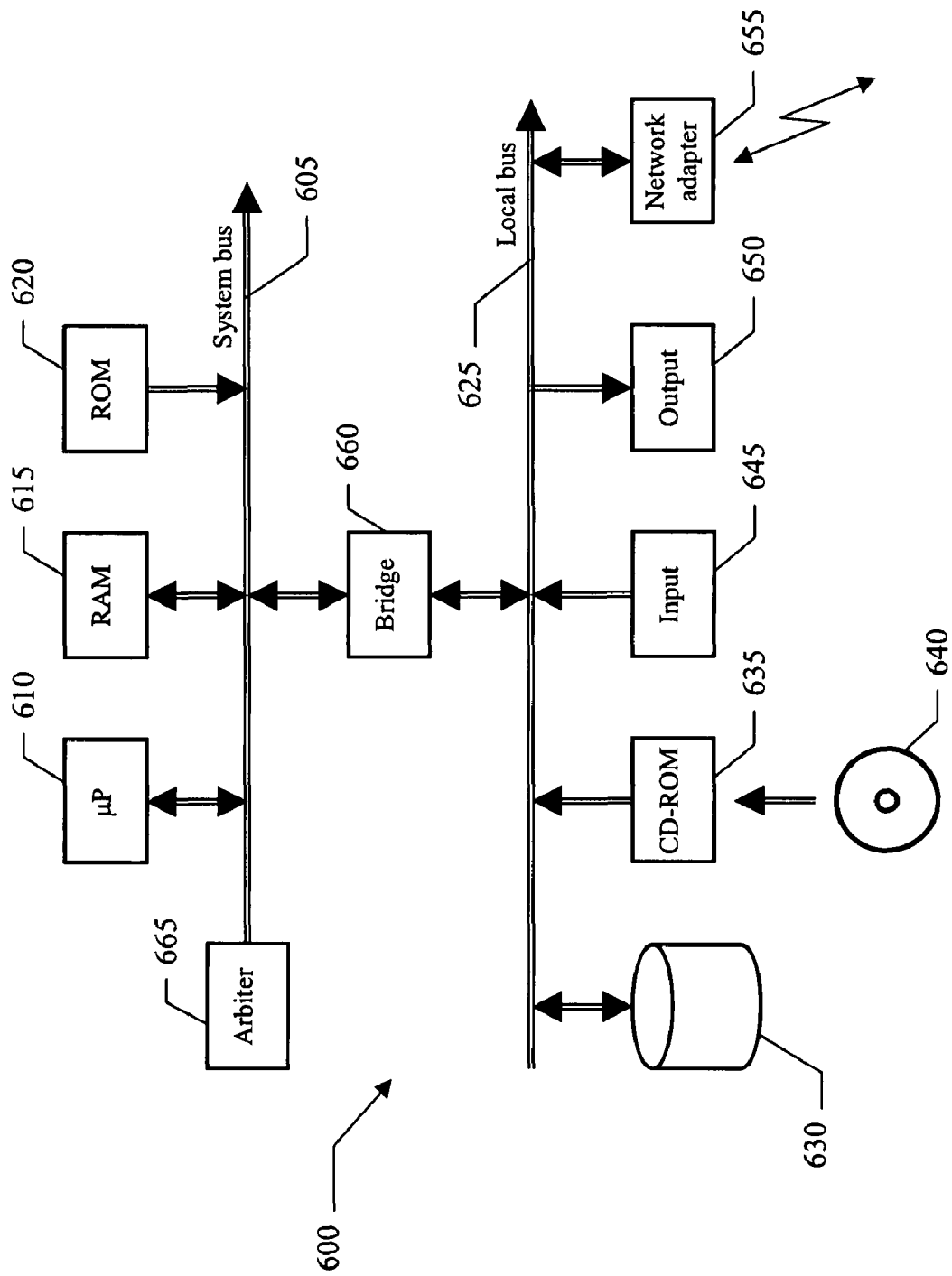
FIG. 6 is a schematic block diagram of a computer system that may be used to implement the solution according to an embodiment of the invention.

With reference now to FIG. 6, the optimization process is typically implemented on a computer 600 (for example, a PC). The computer 600 is formed by several units that are connected in parallel to a system bus 605. In detail, a microprocessor (µP) 610 controls operation of the computer 600; a RAM 615 is directly used as a working memory by the microprocessor 610, and a ROM 620 stores basic code for a bootstrap of the computer 600. Several peripheral units are clustered around a local bus 625 (by means of respective interfaces). Particularly, a mass memory consists of a hard-disk 630 and a drive 635 for reading CD-ROMs 640. Moreover, the computer 600 includes input units 645 (for example, a keyboard and a mouse), and output units 650 (for example, a monitor and a printer). An adapter 655 is used to connect the computer 600 to a network. A bridge unit 660 interfaces the system bus 605 with the local bus 625. The microprocessor 610 and the bridge unit 660 can operate as master agents requesting an access to the system bus 605 for transmitting information. An arbiter 665 manages the granting of the access with mutual exclusion to the system bus 605.

Figure 7:
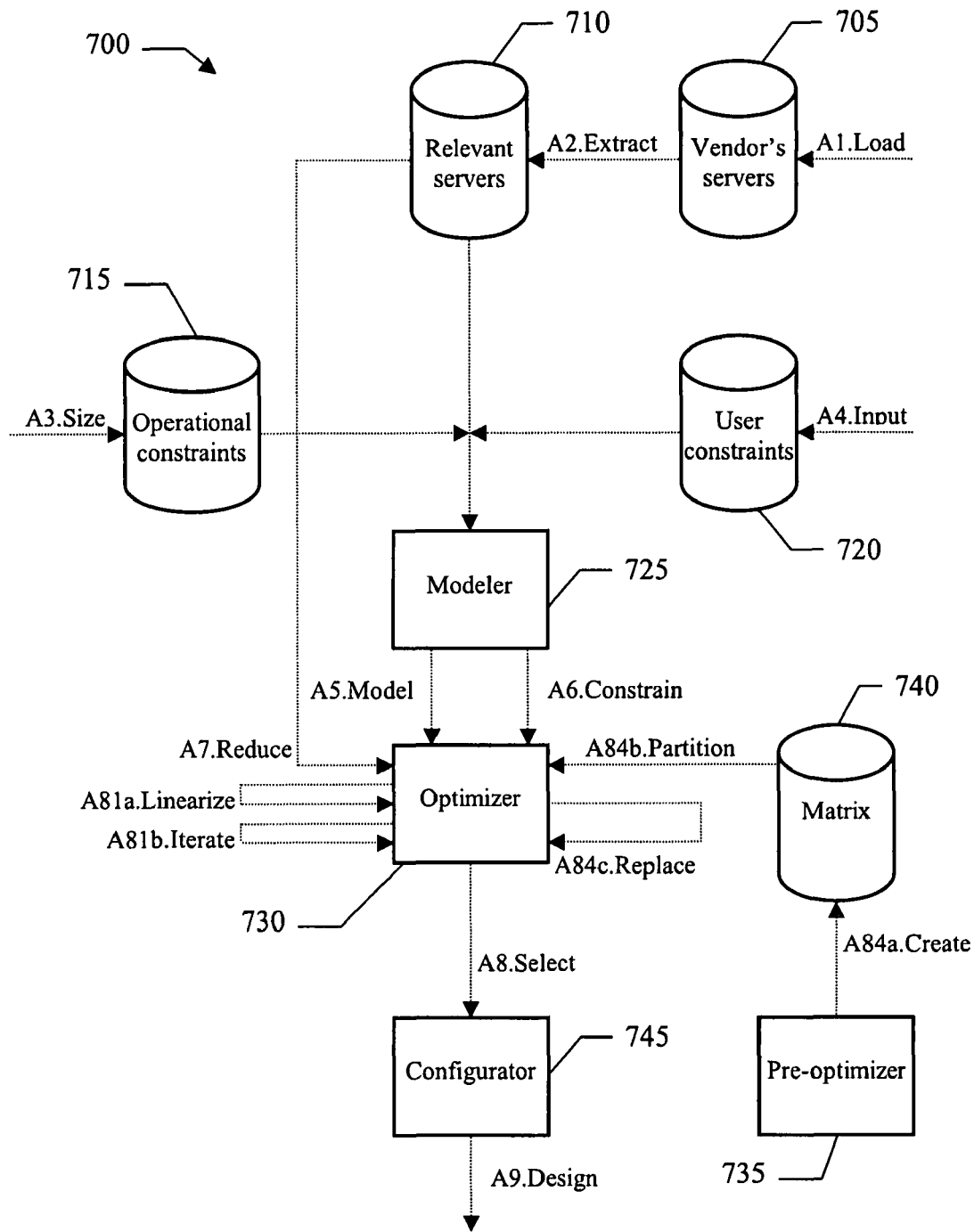
FIG. 7 is a collaboration diagram representing the roles of different software modules implementing the solution according to an embodiment of the invention.

Moving now to FIG. 7, the main software modules that run on the above-described computer are denoted as a whole with the reference 700. The information (programs and data) is typically stored on the hard-disk and loaded (at least partially) into the working memory of the computer when the programs are running. The programs are initially installed onto the hard disk, for example, from CD-ROM. Particularly, the figure describes the static structure of the system (by means of the corresponding modules) and its dynamic behavior (by means of a series of exchanged messages).

Particularly, a repository 705 stores the information relating to each available server, as provided by one or more hardware vendors (action "A1.Load"). Particularly, for each available server the repository 705 includes its cost, available power and available memory. Moreover, the same record also includes the cost for obtaining the server by upgrading each other server (when it is possible). A system designer extracts the information relating to the servers relevant for a specific project from the repository 705 and saves it into another repository 710 (action "A2.Extract").

A repository 715 stores the operational constraints of the desired SAP application (i.e., the required power and the required memory for the application servers, and the required power and the required memory for each DBMS server). This information is generally provided by a software vendor of the SAP application (action "A3.Size"). For example, the operational constraints may be obtained by means of a sizing process, which is performed exploiting standard tools (such as the "Quick Sizer" by SAP AG). A further repository 720 instead stores the user constraints for the same SAP application (i.e., the acceptable power decrease and the expected increase factor). This information is generally provided by a user of the server farm (action "A4.Input").

A modeler 725 extracts the information relating to the (relevant) available servers from the repository 710, the operational constraints from the repository 715 and the user constraints from the repository 720. The modeler 725 then defines a corresponding model for the server farm to be configured (action "A5.Model"). At the same time, the modeler 720 also sets the corresponding constraints for the model (action "A6.Constrain"). Optionally, the modeler 720 may also pre-process the model to exclude some of the available servers as described above with reference to the linearization technique applied to the model of the basic scenario (action "A7.Reduce").

An optimizer 730 then selects the optimal configuration of the server farm, which minimizes its total cost (action "A8.Select"). In this phase, the optimizer 730 may apply the linearization technique (action "A81a.Linearize") or the iterative procedure (action "A81b.Iterate") for the model of the basic scenario. With reference instead to the model for the consolidation scenario, a pre-optimizer 735 optionally calculates the pre-optimization matrix, which is saved into a corresponding table 740 (action "A84a.Create"). The optimizer 730 can then exploit the pre-optimization matrix 740 to determine the optimal partitioning of the SAP applications (action A84b.Partition"). The procedure continues with the determination of the corresponding heterogeneous configurations, from which it is possible to obtain the desired optimal configuration of the server farm (action "A84c.Replace").

A configurator 745 then actually designs the server farm according to this optimal configuration (action "A9.Design").

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

Particularly, similar considerations apply if the server farm has a different architecture or includes equivalent units; more generally, the proposed solution lends itself to be applied to the configuration of any data processing system including whatever code execution entities (such as PDAs, mobile phones, and the like).

In addition, although the proposed solution has been described with a great emphasis for the SAP applications, this is not to be interpreted in a limitative manner; indeed, the same concepts are also applicable to a JD Edwards OneWorld™ application, or more generally to any software application with a multi-tier architecture (i.e., including modules of different types having distinct requirements).

Likewise, the operational requirements may be expressed in equivalent terms (either for the required processing power or the required working memory of the different modules).

Moreover, the cost may relate to either an expense for the client or a prize for the vendor. In any case, it is emphasized that the term cost as used in the present description may also refer to any other design parameter to be optimized—even without any reference to economics aspects (such as an index of reliability of the servers, their connection speeds, and the like). Moreover, it is possible to define the total cost with any other function based on the costs of the eligible servers (such as according to a weighted sum).

It should be readily apparent that the above-described constraints are merely illustrative, and may be replaced with equivalent definitions.

Moreover, the memory may be assigned to the servers according to different functions, even nom-linear (such as of the logarithmic type).

In any case, the proposed model for the basic scenario is in no way limiting. For example, nothing prevents allowing multiple DBMS instances for each SAP application.

Similar considerations apply if the model (with particular reference to its constraints) is defined by equivalent formulas.

Furthermore, the proposed techniques for simplifying the solution of the model in the basic scenario are not comprehensive; in any case, the solution of the model directly in its original form is within the scope of the invention.

Moreover, the high-reliability scenario may take into account an acceptable memory decrease (in addition or in alternative to the acceptable power decrease); the same considerations may also be applied to the DBMS servers (in addition or in alternative to the application servers).

Alternatively, in the scalability scenario the costs may be actualized in an equivalent way. In any case, it is possible to take into account two or more next times; preferably, the information relating to the different times is weighted in the model, so as to reduce the influence of the ones more far away in the future (being less reliable).

At the end, in the consolidation scenario it is possible to remove the constraint assigning a single DBMS/application instance of each SAP application to each (physical) server.

In this case as well, the proposed techniques for simplifying the solution of the model in the consolidation scenario are not comprehensive (with the solution of the model directly in its original form that is within the scope of the invention).

The proposed solution lends itself to be applied to any combination of the above-mentioned scenarios, or to additional ones. For example, it is possible to obtain composite scenarios based on the high-reliability scenario and the scalability scenario (such as assuming that the acceptable power decrease does not change over time), based on the high-reliability scenario and the consolidation scenario, or based on the high-reliability scenario, the scalability scenario and the consolidation scenario.

Even though in the preceding description reference has been made to a stand-alone tool for optimizing the server farm, the same solution may be implemented by means of a specific service (for example, deployed on the Internet as a Web service).

Similar considerations apply if the program (which may be used to implement each embodiment of the invention) is structured in a different way, or if additional modules or functions are provided. Likewise, the memory structures may be of other types, or may be replaced with equivalent entities (not necessarily consisting of physical storage media). Moreover, the proposed solution lends itself to be implemented with an equivalent method (by using similar steps, removing some steps being not essential, or adding further optional steps—even in a different order). In any case, the program may take any form suitable to be used by or in connection with any data processing system, such as external or resident software, firmware, or microcode (either in object code or in source code). Moreover, it is possible to provide the program on any computer-usable medium; the medium can be any element suitable to contain, store, communicate, propagate, or transfer the program. For example, the medium may be of the electronic, magnetic, optical, electromagnetic, infrared, or semiconductor type; examples of such medium are fixed disks (where the program can be pre-loaded), removable disks, tapes, cards, wires, fibers, wireless connections, networks, broadcast waves, and the like. In any case, the solution according to the present invention lends itself to be implemented with a hardware structure (for example, integrated in a chip of semiconductor material), or with a combination of software and hardware.

What is claimed is:

1. A method for configuring a data processing system for hosting at least one software application comprising a set of first modules of a first type and a set of second modules of a second type, the first modules requiring a first required processing power and a first required working memory, and the second modules requiring a second required processing power and a second required working memory, comprising:
   providing an indication of a cost, an available processing power, and an available memory of each one of a plurality of available data processing entities to define available configurations of the system, each configuration comprising a corresponding set of the entities;
   defining a target function indicative of a target cost of the system, the target cost being defined according to a total cost of each configuration based on the costs of the corresponding entities, wherein the target function is constrained by a set of constraints for the available processing power and the available memory of each entity based on the first required processing power, the first required memory, the second required processing power and the second required memory, the constraints being simplified by setting the available memory of each entity as a predefined function of the corresponding available processing power;
   selecting one of the configurations optimizing the target function; and
   configuring the system according to the selected configuration.

2. The method according to claim 1, wherein the predefined function comprises a linear function.

3. The method according to claim 1, wherein the at least one software application consists of a single software application with the set of the second modules consisting of a single second module, and wherein the constraints allow hosting at most a single module of the software application on each entity.

4. The method according to claim 3, wherein defining the target function comprises:
   setting the available memory of each entity hosting a first module at least equal to the first required memory multiplied by the available processing power of the entity divided by a sum of the available processing powers of all the entities hosting the first modules.

5. The method according to claim 4, further comprising:
   linearizing the simplified constraints by setting the available memory of each entity hosting a first module at least equal to the first required memory multiplied by the available processing power of the entity divided by the first required processing power.

6. The method according to claim 4, wherein selecting one of the configurations optimizing the target function comprises iterating the operations of:
   further simplifying the simplified constraints, at a first iteration the operation of further simplifying comprising setting the sum of the available memories of all the entities hosting the first modules at least equal to the first required memory, and at each next iteration the operation of further simplifying comprises setting the available memory of each entity hosting a first module at least equal to the first required memory multiplied by the available processing power of the entity divided by an intermediate sum of the available processing powers of all the entities hosting the first modules in an intermediate configuration at a preceding iteration; and
   determining the intermediate configuration by optimizing the target function with the further simplified constraints;
   until the intermediate sum is substantially unchanged.

7. The method according to claim 1, further comprising:
   providing an indication of an acceptable power decrease of the entities hosting the first modules in case of a failure of a predetermined failing number of the entities hosting the first modules, the constraints further setting a sum of the available processing powers of all the entities hosting the first modules minus every combination of the failing number of the entities hosting the first modules at least equal to the first required processing power reduced by the acceptable power decrease.

8. The method according to claim 1, further comprising:
   providing an indication of a further first required processing power, a further first required memory, a further second required processing power, and a further second required memory at one or more further times following a current time relating to the first required processing power, the first required memory, the second required processing power, and the second required memory,
   providing an indication of a further cost, a further available processing power and a further available memory of each one of a plurality of further entities available to define further available configurations of the system at each further time, and providing an indication of a still further cost for obtaining each further entity from each entity at a preceding time, the target cost being defined according to a total cost at the current time and an upgrading cost at each next time for obtaining each further configuration at the next time from each configuration at a preceding time, and the target function being further constrained by further constraints for the further available processing power and the further available memory of each further entity based on the further first required processing power, the further first required memory, the further second required processing power and the further second required memory at each next time.

9. The method according to claim 1, wherein the at least one software application comprises a plurality of software applications, the set of the second modules of each software application consisting of a single second module, and wherein the constraints assign at most a single module of each software application to each entity.

10. The method according to claim 9, wherein selecting one of the configurations comprises:
    pre-selecting a plurality of the configurations, each pre-selected configuration optimizing the target total cost of the system for hosting a simplified software application with a single type of module requiring a different pair of a sample required processing power and a sample required working memory;
    choosing a set of the pre-selected configurations for hosting the software applications, the chosen pre-selected configurations optimizing a partitioning cost based on the target total costs of the corresponding pre-selected configurations; and
    determining the selected configuration according to the chosen pre-selected configurations.

11. The method according to claim 10, wherein the pre-selected configurations are pre-selected only among the configurations including homogeneous entities, and wherein selecting one of the configurations further comprises:
    replacing each chosen pre-selected configuration with one of the configurations optimizing the target total cost of the system for hosting the first modules and/or the second modules of the software applications corresponding to the chosen pre-selected configuration.

12. A program product stored on a non-transitory computer readable medium, which when executed, configures a data processing system for hosting at least one software application comprising a set of first modules of a first type and a set of second modules of a second type, the first modules requiring a first required processing power and a first required working memory, and the second modules requiring a second required processing power and a second required working memory, the non-transitory computer readable medium comprising program code for:
- providing an indication of a cost, an available processing power, and an available memory of each one of a plurality of available data processing entities to define available configurations of the system, each configuration comprising a corresponding set of the entities;
- defining a target function indicative of a target cost of the system, the target cost being defined according to a total cost of each configuration based on the costs of the corresponding entities, wherein the target function is constrained by a set of constraints for the available processing power and the available memory of each entity based on the first required processing power, the first required memory, the second required processing power and the second required memory, the constraints being simplified by setting the available memory of each entity as a predefined function of the corresponding available processing power;
- selecting one of the configurations optimizing the target function; and
- configuring the system according to the selected configuration.

13. A system for configuring a data processing system for hosting at least one software application comprising a set of first modules of a first type and a set of second modules of a second type, the first modules requiring a first required processing power and a first required working memory, and the second modules requiring a second required processing power and a second required working memory, comprising:
- a system for providing an indication of a cost, an available processing power, and an available memory of each one of a plurality of available data processing entities to define available configurations of the system, each configuration comprising a corresponding set of the entities;
- a system for defining a target function indicative of a target cost of the system, the target cost being defined according to a total cost of each configuration based on the costs of the corresponding entities, wherein the target function is constrained by a set of constraints for the available processing power and the available memory of each entity based on the first required processing power, the first required memory, the second required processing power and the second required memory, the constraints being simplified by setting the available memory of each entity as a predefined function of the corresponding available processing power;
- a system for selecting one of the configurations optimizing the target function; and
- a system for configuring the system according to the selected configuration.

14. A method for deploying an application for configuring a data processing system for hosting at least one software application comprising a set of first modules of a first type and a set of second modules of a second type, the first modules requiring a first required processing power and a first required working memory, and the second modules requiring a second required processing power and a second required working memory, comprising:
- providing a computer infrastructure being operable to:
  - provide an indication of a cost, an available processing power, and an available memory of each one of a plurality of available data processing entities to define available configurations of the system, each configuration comprising a corresponding set of the entities;
  - define a target function indicative of a target cost of the system, the target cost being defined according to a total cost of each configuration based on the costs of the corresponding entities, wherein the target function is constrained by a set of constraints for the available processing power and the available memory of each entity based on the first required processing power, the first required memory, the second required processing power and the second required memory, the constraints being simplified by setting the available memory of each entity as a predefined function of the corresponding available processing power;
  - select one of the configurations optimizing the target function; and
  - configure the system according to the selected configuration.

* * * * *